United States Patent
Wang et al.

(10) Patent No.: US 10,812,232 B2
(45) Date of Patent: Oct. 20, 2020

(54) METHOD AND APPARATUS FOR TRANSMITTING BASE STATION DATA, AND DEVICE

(71) Applicant: HUAWEI TECHNOLOGIES CO., LTD., Shenzhen, Guangdong (CN)

(72) Inventors: Libiao Wang, Shenzhen (CN); Fan Jin, Shenzhen (CN); Wei Chen, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/728,429

(22) Filed: Dec. 27, 2019

(65) Prior Publication Data

US 2020/0136772 A1    Apr. 30, 2020

Related U.S. Application Data

(63) Continuation of application No. PCT/CN2017/090899, filed on Jun. 29, 2017.

(51) Int. Cl.
*H04L 5/00* (2006.01)
*H04W 16/28* (2009.01)
*H04W 72/12* (2009.01)

(52) U.S. Cl.
CPC .......... *H04L 5/0035* (2013.01); *H04W 16/28* (2013.01); *H04W 72/1231* (2013.01)

(58) Field of Classification Search
CPC .. H04L 5/0035; H04W 72/1231; H04W 16/28
See application file for complete search history.

(56) References Cited

U.S. PATENT DOCUMENTS

2013/0039349 A1* 2/2013 Ebrahimi Tazeh Mahalleh .......... H04L 1/0013 370/336
2013/0083681 A1* 4/2013 Ebrahimi Tazeh Mahalleh .......... H04L 5/0057 370/252

(Continued)

FOREIGN PATENT DOCUMENTS

| CN | 104660315 A | 5/2015 |
|---|---|---|
| CN | 105052065 A | 11/2015 |

(Continued)

OTHER PUBLICATIONS

3GPP TR 38.802 V14.1.0 (Jun. 2017), 3rd Generation Partnership Project; Technical Specification Group Radio Access Network; Study on New Radio Access Technology Physical Layer Aspects (Release 14) , Jun. 23, 2017, total 144 pages.

(Continued)

*Primary Examiner* — Jean B Corrielus
(74) *Attorney, Agent, or Firm* — Womble Bond Dickinson (US) LLP

(57) ABSTRACT

Embodiments of this application disclose a method for scheduling a terminal. The method includes the following operations: receiving a precoding matrix indication PMI value and reference signal received power RSRP that are sent by user equipment; determining, based on the PMI value, grouping of a network area corresponding to the user equipment; and determining, based on the RSRP, a network area in which the user equipment is located. This application has the advantage of avoiding interference between network areas.

9 Claims, 4 Drawing Sheets

(56) References Cited

U.S. PATENT DOCUMENTS

| | | | |
|---|---|---|---|
| 2014/0198677 A1 | 7/2014 | Xu et al. | |
| 2015/0043457 A1* | 2/2015 | Liu | H04B 7/024 370/329 |
| 2017/0126356 A1 | 5/2017 | Xu et al. | |
| 2018/0278307 A1* | 9/2018 | He | H04W 72/0413 |

FOREIGN PATENT DOCUMENTS

| | | |
|---|---|---|
| WO | 2012057462 A1 | 5/2012 |
| WO | 2015156496 A2 | 10/2015 |
| WO | 2016140603 A1 | 9/2016 |
| WO | 2017065655 A1 | 4/2017 |
| WO | 2017092383 A1 | 6/2017 |

OTHER PUBLICATIONS

3GPP TS 36.213 V14.3.0 (Jun. 2017), 3rd Generation Partnership Project; Technical Specification Group Radio Access Network; Evolved Universal Terrestrial Radio Access (E-UTRA); Physical layer procedures (Release 14), Jun. 23, 2017, total 144 pages.

\* cited by examiner

METHOD AND APPARATUS FOR TRANSMITTING BASE STATION DATA, AND DEVICE

CROSS-REFERENCE TO RELATED APPLICATIONS

This application is a continuation of International Application No. PCT/CN2017/090899, filed on Jun. 29, 2017, the disclosure of which is hereby incorporated by reference in its entirety.

TECHNICAL FIELD

This application relates to the field of communication, and in particular, to a method and an apparatus for transmitting base station data, and a device.

BACKGROUND

With development of wireless communications systems, a system capacity is greatly improved by using technologies such as a multiple input multiple output (MIMO) technology and a higher order modulation technology. To obtain more spatial multiplexing gains, a cell capacity is greatly improved by using a multi-sector multi-beam technology. However, as the quantity of sectors or beams of a single site increases, because a same frequency band is shared among the sectors or the beams, user equipment (UE) served by the single site may be strongly interfered with within coverage of the sectors or the beams, and performance of the UE located within the coverage of the sectors or the beams may be affected greatly.

SUMMARY

In view of the foregoing technical problem, embodiments of this application provide a method for transmitting base station data, to resolve a problem of interference between network areas in the prior art.

According to a first aspect, a method for scheduling a terminal is provided, and includes the following operations:

receiving, by a first base station in a joint scheduling base station group, a precoding matrix indication (PMI) value and reference signal received power (RSRP) that are sent by user equipment;

determining, by a remote radio unit (RRU) of the first base station in the joint scheduling base station group, based on the RSRP, a network area to which the UE belongs;

if the UE is served by the first base station in the joint scheduling base station group, allocating, by the first base station in the joint scheduling base station group, an equivalent channel that corresponds to the first base station and that is in a first equivalent channel group to the UE based on the PMI value; and if the UE belongs to an overlapped area of the first base station and a second base station that are in the joint scheduling base station group, jointly allocating, by the first base station and the second base station that are in the joint scheduling base station group, an equivalent channel that corresponds to the first base station and the second base station and that is in a second equivalent channel group to the UE based on the PMI value, stopping, by the first base station, transmitting data on the first equivalent channel, and jointly stopping, by the first base station and the second base station, sending data on a third equivalent channel corresponding to the second base station, where the first equivalent channel group and the second equivalent channel group have different radio frequency channels.

In one embodiment, if there are four port numbers for the UE, when PMI=0, a first equivalent channel in the first channel group and allocated to the user equipment is:

$$[T_0 \ \ldots \ T_{2M-1}]V\frac{1}{2}\begin{bmatrix}1\\1\\1\\1\end{bmatrix} = [T_0 \ \ldots \ T_{2M-1}]\frac{1}{\sqrt{2}}\begin{bmatrix}1\\1\\0\\0\\1\\1\\0\\0\\\vdots\end{bmatrix},$$

where $T_{2M-1}$ is a $(2M)^{th}$ network area, V is a port mapping matrix of the user equipment, and the ellipsis represents 2M-8 repeated digits;

when PMI=2, a second equivalent channel in the first channel group and allocated to the user equipment is:

$$[T_0 \ \ldots \ T_{2M-1}]V\frac{1}{2}\begin{bmatrix}1\\-1\\1\\-1\end{bmatrix} = [T_0 \ \ldots \ T_{2M-1}]\frac{1}{\sqrt{2}}\begin{bmatrix}1\\-1\\0\\0\\1\\-1\\0\\0\\\vdots\end{bmatrix};$$

when PMI=9, a third equivalent channel in the first channel group and allocated to the user equipment is:

$$[T_0 \ \ldots \ T_{2M-1}]V\frac{1}{2}\begin{bmatrix}1\\j\\1\\j\end{bmatrix} = [T_0 \ \ldots \ T_{2M-1}]\frac{1}{\sqrt{2}}\begin{bmatrix}1\\j\\0\\0\\1\\j\\0\\0\\\vdots\end{bmatrix};$$

when PMI=11, a fourth equivalent channel in the first channel group and allocated to the user equipment is:

$$[T_0 \ \ldots \ T_{2M-1}]V\frac{1}{2}\begin{bmatrix}1\\-j\\1\\-j\end{bmatrix} = [T_0 \ \ldots \ T_{2M-1}]\frac{1}{\sqrt{2}}\begin{bmatrix}1\\-j\\0\\0\\1\\-j\\0\\0\\\vdots\end{bmatrix};$$

when PMI=1, a fifth equivalent channel in the first channel group and $$[T_0 \quad \ldots \quad T_{2M-1}]V\frac{1}{2}\begin{bmatrix}1\\j\\-1\\-j\end{bmatrix} = [T_0 \quad \ldots \quad T_{2M-1}]\frac{1}{\sqrt{2}}\begin{bmatrix}0\\0\\j\\-1\\0\\0\\j\\-1\\\vdots\end{bmatrix};$$

when PMI=3, a sixth equivalent channel in the first channel group and allocated to the user equipment is:

$$[T_0 \quad \ldots \quad T_{2M-1}]V\frac{1}{2}\begin{bmatrix}1\\-j\\-1\\j\end{bmatrix} = [T_0 \quad \ldots \quad T_{2M-1}]\frac{1}{\sqrt{2}}\begin{bmatrix}0\\0\\j\\1\\0\\0\\j\\1\\\vdots\end{bmatrix};$$

when PMI=8, a seventh equivalent channel in the first channel group and allocated to the user equipment is:

$$[T_0 \quad \ldots \quad T_{2M-1}]V\frac{1}{2}\begin{bmatrix}1\\1\\-1\\-1\end{bmatrix} = [T_0 \quad \ldots \quad T_{2M-1}]\frac{1}{\sqrt{2}}\begin{bmatrix}0\\0\\1\\1\\0\\0\\1\\1\\\vdots\end{bmatrix};$$

and when PMI=10, an eighth equivalent channel in the first channel group and allocated to the user equipment is:

$$[T_0 \quad \ldots \quad T_{2M-1}]V\frac{1}{2}\begin{bmatrix}1\\-1\\-1\\1\end{bmatrix} = [T_0 \quad \ldots \quad T_{2M-1}]\frac{1}{\sqrt{2}}\begin{bmatrix}0\\0\\1\\-1\\0\\0\\1\\-1\\\vdots\end{bmatrix}.$$

In another embodiment, if there are four port numbers for the UE, and if PMI=4, a ninth equivalent channel in the second channel group and allocated to the user equipment is:

$$[T_0 \quad \ldots \quad T_{2M-1}]V\frac{1}{2}\begin{bmatrix}1\\\frac{1}{\sqrt{2}}(1+j)\\j\\-\frac{1}{\sqrt{2}}(1-j)\end{bmatrix} = [T_0 \quad \ldots \quad T_{2M-1}]\frac{1}{\sqrt{2}}\begin{bmatrix}\frac{1}{2}(1+j)\\\frac{1}{\sqrt{2}}j\\\frac{1}{2}(1+j)\\\frac{1}{\sqrt{2}}j\\\frac{1}{2}(1+j)\\\frac{1}{\sqrt{2}}j\\\frac{1}{2}(1+j)\\\frac{1}{\sqrt{2}}j\\\vdots\end{bmatrix},$$

where $T_{2M-1}$ is a $(2M)^{th}$ network area, V is a port mapping matrix of the user equipment, and the ellipsis represents 2M-8 repeated digits;

when PMI=5, a tenth equivalent channel in the second channel group and allocated to the user equipment is:

$$[T_0 \quad \ldots \quad T_{2M-1}]V\frac{1}{2}\begin{bmatrix}1\\-\frac{1}{\sqrt{2}}(1-j)\\-j\\\frac{1}{\sqrt{2}}(1+j)\end{bmatrix} = [T_0 \quad \ldots \quad T_{2M-1}]\frac{1}{\sqrt{2}}\begin{bmatrix}\frac{1}{2}(1-j)\\\frac{1}{\sqrt{2}}j\\\frac{1}{2}(1-j)\\-\frac{1}{\sqrt{2}}j\\\frac{1}{2}(1-j)\\\frac{1}{\sqrt{2}}j\\\frac{1}{2}(1-j)\\-\frac{1}{\sqrt{2}}j\\\vdots\end{bmatrix};$$

when PMI=6, an eleventh equivalent channel in the second channel group and allocated to the user equipment is:

$$[T_0 \quad \ldots \quad T_{2M-1}]V\frac{1}{2}\begin{bmatrix}1\\-\frac{1}{\sqrt{2}}(1+j)\\j\\\frac{1}{\sqrt{2}}(1-j)\end{bmatrix} = [T_0 \quad \ldots \quad T_{2M-1}]\frac{1}{\sqrt{2}}\begin{bmatrix}\frac{1}{2}(1+j)\\-\frac{1}{\sqrt{2}}j\\\frac{1}{2}(1+j)\\-\frac{1}{\sqrt{2}}j\\\frac{1}{2}(1+j)\\-\frac{1}{\sqrt{2}}j\\\frac{1}{2}(1+j)\\-\frac{1}{\sqrt{2}}j\\\vdots\end{bmatrix};$$

when PMI=7, a twelfth equivalent channel in the second channel group and allocated to the user equipment is:

$$[T_0 \ \ldots \ T_{2M-1}]V\frac{1}{2}\begin{bmatrix}1\\\frac{1}{\sqrt{2}}(1-j)\\-j\\-\frac{1}{\sqrt{2}}(1+j)\end{bmatrix} = [T_0 \ \ldots \ T_{2M-1}]\frac{1}{\sqrt{2}}\begin{bmatrix}\frac{1}{2}(1-j)\\-\frac{1}{\sqrt{2}}j\\\frac{1}{2}(1-j)\\\frac{1}{\sqrt{2}}j\\\frac{1}{2}(1-j)\\-\frac{1}{\sqrt{2}}j\\\frac{1}{2}(1-j)\\\frac{1}{\sqrt{2}}j\\\vdots\end{bmatrix};$$

when PMI=12, a thirteenth equivalent channel in the second channel group and allocated to the user equipment is:

$$[T_0 \ \ldots \ T_{2M-1}]V\frac{1}{2}\begin{bmatrix}1\\1\\1\\-1\end{bmatrix} = [T_0 \ \ldots \ T_{2M-1}]\frac{1}{\sqrt{2}}\begin{bmatrix}1\\0\\0\\j\\1\\0\\0\\j\\\vdots\end{bmatrix};$$

when PMI=13, a fourteenth equivalent channel in the second channel group and allocated to the user equipment is:

$$[T_0 \ \ldots \ T_{2M-1}]V\frac{1}{2}\begin{bmatrix}1\\1\\-1\\1\end{bmatrix} = [T_0 \ \ldots \ T_{2M-1}]\frac{1}{\sqrt{2}}\begin{bmatrix}0\\1\\j\\0\\0\\1\\j\\0\\\vdots\end{bmatrix};$$

when PMI=14, a fifteenth equivalent channel in the second channel group and allocated to the user equipment is:

$$[T_0 \ \ldots \ T_{2M-1}]V\frac{1}{2}\begin{bmatrix}-1\\1\\1\\1\end{bmatrix} = [T_0 \ \ldots \ T_{2M-1}]\frac{1}{\sqrt{2}}\begin{bmatrix}0\\1\\-j\\0\\0\\1\\-j\\0\\\vdots\end{bmatrix};$$

and when PMI=15, a sixteenth equivalent channel in the second channel group and allocated to the user equipment is:

$$[T_0 \ \ldots \ T_{2M-1}]V\frac{1}{2}\begin{bmatrix}1\\-1\\-1\\-1\end{bmatrix} = [T_0 \ \ldots \ T_{2M-1}]\frac{1}{\sqrt{2}}\begin{bmatrix}0\\-1\\j\\0\\0\\-1\\j\\0\\\vdots\end{bmatrix}.$$

In still another embodiment, if there are eight ports for the UE, and if PMI=0, a seventeenth equivalent channel in the first channel group and allocated to the user equipment is:

$$[T_0 \ \ldots \ T_{2M-1}]V\frac{1}{\sqrt{8}}\begin{bmatrix}1\\1\\1\\1\\1\\1\\1\\1\end{bmatrix} = [T_0 \ \ldots \ T_{2M-1}]V\frac{1}{\sqrt{2}}\begin{bmatrix}1\\1\\0\\0\\1\\1\\0\\0\\\vdots\end{bmatrix},$$

where $T_{2M-1}$ is a $(2M)^{th}$ network area, V is a port mapping matrix of the user equipment, and the ellipsis represents 2M-8 repeated digits in the first to the eighth rows;

if PMI=7, an eighteenth equivalent channel in the first channel group and allocated to the user equipment is:

$$[T_0 \ \ldots \ T_{2M-1}]V\frac{1}{\sqrt{8}}\begin{bmatrix}1\\1\\1\\1\\j\\j\\j\\j\end{bmatrix} = [T_0 \ \ldots \ T_{2M-1}]V\frac{1}{\sqrt{2}}\begin{bmatrix}1\\1\\0\\0\\j\\j\\0\\0\\\vdots\end{bmatrix};$$

if PMI=8, a nineteenth equivalent channel in the first channel group and allocated to the user equipment is:

$$[T_0 \ \ldots \ T_{2M-1}]V\frac{1}{\sqrt{8}}\begin{bmatrix}1\\1\\1\\1\\-1\\-1\\-1\\-1\end{bmatrix} = [T_0 \ \ldots \ T_{2M-1}]V\frac{1}{\sqrt{2}}\begin{bmatrix}1\\1\\0\\0\\-1\\-1\\0\\0\\\vdots\end{bmatrix};$$

if PMI=16, a twentieth equivalent channel in the first channel group and allocated to the user equipment is:

$$[T_0 \ \ldots \ T_{2M-1}]V\frac{1}{\sqrt{8}}\begin{bmatrix}1\\1\\1\\1\\-j\\-j\\-j\\-j\end{bmatrix} = [T_0 \ \ldots \ T_{2M-1}]V\frac{1}{\sqrt{2}}\begin{bmatrix}1\\1\\0\\0\\-j\\-j\\0\\0\\\vdots\end{bmatrix};$$

if PMI=36, a twenty-first equivalent channel in the first channel group and allocated to the user equipment is:

$$[T_0 \ \ldots \ T_{2M-1}]V\frac{1}{\sqrt{8}}\begin{bmatrix}1\\-1\\1\\-1\\1\\-1\\1\\-1\end{bmatrix} = [T_0 \ \ldots \ T_{2M-1}]V\frac{1}{\sqrt{2}}\begin{bmatrix}1\\-1\\0\\0\\1\\-1\\0\\0\\\vdots\end{bmatrix};$$

if PMI=44, a twenty-second equivalent channel in the first channel group and allocated to the user equipment is:

$$[T_0 \ \ldots \ T_{2M-1}]V\frac{1}{\sqrt{8}}\begin{bmatrix}1\\-1\\1\\-1\\-1\\1\\-1\\1\end{bmatrix} = [T_0 \ \ldots \ T_{2M-1}]V\frac{1}{\sqrt{2}}\begin{bmatrix}1\\-1\\0\\0\\-1\\1\\0\\0\\\vdots\end{bmatrix};$$

if PMI=72, a twenty-third equivalent channel in the first channel group and allocated to the user equipment is:

$$[T_0 \ \ldots \ T_{2M-1}]V\frac{1}{\sqrt{8}}\begin{bmatrix}1\\-1\\1\\-1\\j\\-j\\j\\-j\end{bmatrix} = [T_0 \ \ldots \ T_{2M-1}]V\frac{1}{\sqrt{2}}\begin{bmatrix}1\\-1\\0\\0\\j\\-j\\0\\0\\\vdots\end{bmatrix};$$

if PMI=88, a twenty-fourth equivalent channel in the first channel group and allocated to the user equipment is:

$$[T_0 \ \ldots \ T_{2M-1}]V\frac{1}{\sqrt{8}}\begin{bmatrix}1\\-1\\1\\-1\\-j\\j\\-j\\j\end{bmatrix} = [T_0 \ \ldots \ T_{2M-1}]V\frac{1}{\sqrt{2}}\begin{bmatrix}1\\-1\\0\\0\\-j\\j\\0\\0\\\vdots\end{bmatrix};$$

if PMI=1, a twenty-fifth equivalent channel in the first channel group and allocated to the user equipment is:

$$[T_0 \ \ldots \ T_{2M-1}]V\frac{1}{\sqrt{8}}\begin{bmatrix}1\\j\\-1\\-j\\1\\j\\-1\\-j\end{bmatrix} = [T_0 \ \ldots \ T_{2M-1}]V\frac{1}{\sqrt{2}}\begin{bmatrix}0\\0\\j\\-1\\0\\0\\j\\-1\\\vdots\end{bmatrix};$$

if PMI=3, a twenty-sixth equivalent channel in the first channel group and allocated to the user equipment is:

$$[T_0 \ \ldots \ T_{2M-1}]V\frac{1}{\sqrt{8}}\begin{bmatrix}1\\j\\-1\\-j\\-j\\1\\j\\-1\end{bmatrix} = [T_0 \ \ldots \ T_{2M-1}]V\frac{1}{\sqrt{2}}\begin{bmatrix}0\\0\\j\\-1\\0\\0\\-1\\-j\\\vdots\end{bmatrix};$$

if PMI=6, a twenty-seventh equivalent channel in the first channel group and allocated to the user equipment is:

$$[T_0 \ldots T_{2M-1}]V\frac{1}{\sqrt{8}}\begin{bmatrix}1\\j\\-1\\-j\\-1\\-j\\1\\j\end{bmatrix} = [T_0 \ldots T_{2M-1}]V\frac{1}{\sqrt{2}}\begin{bmatrix}0\\0\\j\\-1\\0\\0\\-j\\1\\\vdots\end{bmatrix};$$

if PMI=12, a twenty-eighth equivalent channel in the first channel group and allocated to the user equipment is:

$$[T_0 \ldots T_{2M-1}]V\frac{1}{\sqrt{8}}\begin{bmatrix}1\\j\\-1\\-j\\j\\-1\\-j\\1\end{bmatrix} = [T_0 \ldots T_{2M-1}]V\frac{1}{\sqrt{2}}\begin{bmatrix}0\\0\\j\\-1\\0\\0\\1\\j\\\vdots\end{bmatrix};$$

if PMI=17, a twenty-ninth equivalent channel in the first channel group and allocated to the user equipment is:

$$[T_0 \ldots T_{2M-1}]V\frac{1}{\sqrt{8}}\begin{bmatrix}1\\-j\\-1\\j\\1\\-j\\-1\\j\end{bmatrix} = [T_0 \ldots T_{2M-1}]V\frac{1}{\sqrt{2}}\begin{bmatrix}0\\0\\j\\1\\0\\0\\j\\1\\\vdots\end{bmatrix};$$

if PMI=20, a thirtieth equivalent channel in the first channel group and allocated to the user equipment is:

$$[T_0 \ldots T_{2M-1}]V\frac{1}{\sqrt{8}}\begin{bmatrix}1\\-j\\-1\\j\\j\\1\\-j\\-1\end{bmatrix} = [T_0 \ldots T_{2M-1}]V\frac{1}{\sqrt{2}}\begin{bmatrix}0\\0\\j\\1\\0\\0\\-1\\j\\\vdots\end{bmatrix};$$

if PMI=32, a thirty-first equivalent channel in the first channel group and allocated to the user equipment is:

$$[T_0 \ldots T_{2M-1}]V\frac{1}{\sqrt{8}}\begin{bmatrix}1\\-j\\-1\\j\\-1\\j\\1\\-j\end{bmatrix} = [T_0 \ldots T_{2M-1}]V\frac{1}{\sqrt{2}}\begin{bmatrix}0\\0\\j\\1\\0\\0\\-j\\-1\\\vdots\end{bmatrix};$$

and
if PMI=40, a thirty-second equivalent channel in the first channel group and allocated to the user equipment is:

$$[T_0 \ldots T_{2M-1}]V\frac{1}{\sqrt{8}}\begin{bmatrix}1\\-j\\-1\\j\\-j\\-1\\j\\1\end{bmatrix} = [T_0 \ldots T_{2M-1}]V\frac{1}{\sqrt{2}}\begin{bmatrix}0\\0\\j\\1\\0\\0\\1\\-j\\\vdots\end{bmatrix}.$$

According to a second aspect, an apparatus for transmitting base station data is provided. The apparatus is deployed in a first base station in a joint scheduling base station group and includes: a receiving unit, configured to receive a precoding matrix indication (PMI) value and reference signal received power (RSRP) that are sent by user equipment; a remote radio unit, configured to determine, based on the RSRP, a network area to which the UE belongs; and a processing unit, configured to: if the UE is served by the first base station in the joint scheduling base station group, allocate an equivalent channel that corresponds to the first base station and that is in a first equivalent channel group to the UE based on the PMI value; if the UE belongs to an overlapped area of the first base station and a second base station that are in the joint scheduling base station group, allocate an equivalent channel that corresponds to the first base station and the second base station and that is in a second equivalent channel group to the UE based on the PMI value, stop transmitting data on the first equivalent channel, and stop sending data on a third equivalent channel corresponding to the second base station, where the first equivalent channel group and the second equivalent channel group have different radio frequency channels.

According to a third aspect, a base station is provided. The base station is a base station in a joint scheduling base station group and includes a communications interface, a memory, a processor, and a remote radio unit, where the communications interface is configured to receive a precoding matrix indication (PMI) value and reference signal received power (RSRP) that are sent by user equipment; the remote radio unit is configured to determine, based on the RSRP, a network area to which the UE belongs; and the processor is configured to: if the UE is served by the base station in the joint scheduling base station group, allocate an equivalent channel that corresponds to the base station and that is in a first equivalent channel group to the UE based on the PMI value; and if the UE belongs to an overlapped area of the base station and another base station that are in the joint scheduling base station group, allocate an equivalent channel that corresponds to the base station and the another base station and that is in a second equivalent channel group to the UE based on the PMI value, stop, by the base station, transmitting data on the first equivalent channel, and jointly stop, by the base station and the another base station, sending data on a third equivalent channel corresponding to the another base station, where the first equivalent channel group and the second equivalent channel group have different radio frequency channels.

According to a fourth aspect, a computer-readable storage medium is provided. The computer-readable storage medium stores a computer program used to exchange electronic data, where the computer program enables a computer to perform the method according to the first aspect.

According to a fifth aspect, a computer program product is provided, and includes a non-transitory computer-readable storage medium that stores a computer program, where the computer program is run to enable a computer to perform the method according to the first aspect.

BRIEF DESCRIPTION OF DRAWINGS

To describe technical solutions in embodiments of this application or in the prior art more clearly, the following briefly describes the accompanying drawings required for describing the embodiments. Apparently, the accompanying drawings in the following description show merely some embodiments of this application, and a person of ordinary skill in the art may still derive other accompanying drawings from these accompanying drawings without creative efforts.

DESCRIPTION OF EMBODIMENTS

The following clearly describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

Figure 1:
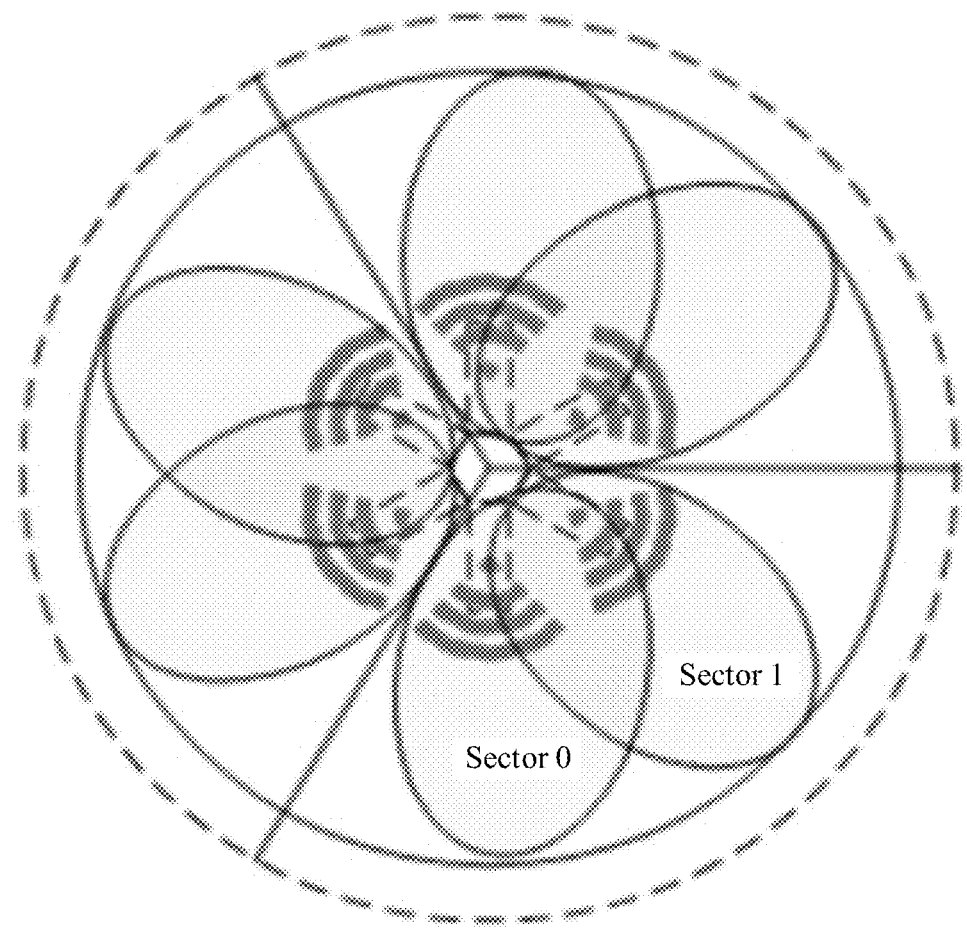
FIG. 1 is a schematic diagram of a network structure implementing virtual four transmitter four receiver (V4T4R)

FIG. 1 is a schematic diagram of a virtual cell with virtual four transmitter four receiver (V4T4R). As shown in FIG. 1, the virtual cell is provided with six sectors or beams, and for ease of description, two of the six sectors or beams are named as Beam0 and Beam1. Based on a V4T4R technical solution, in an overlapped area of Beam0 and Beam1, data transmission is performed through independent scheduling, and a 4T4R mode is used to ensure transmission of four maximum streams. The following takes three UEs as a practical example, for ease of description, the three UEs are respectively named as UE 1, UE 2, and UE 3. The UE 1 is in a sector adjacent to Beam0, the UE 2 is in the overlapped area of Beam0 and Beam1, and the UE 3 is in a sector adjacent to Beam1. A base station uses the 4T4R mode to transmit data to the UE 2 in a slot 1, and transmits data to the UE 1 and the UE 3 in the slot 1. Because the base station transmits data in the 4T4R mode in the overlapped area, interference between UE in Beam0 and UE in Beam1 can be avoided. However, for the UE 1 or the UE 3, because the base station also transmits data in the slot 1, if the UE 1 is in an overlapped area of Beam0 and an adjacent sector, or the UE 3 is in an overlapped area of Beam1 and an adjacent sector, data transmission performed with the UE 1 or the UE 3 will affect data transmission performed with the UE 2, thereby causing interference.

Figure 2A:
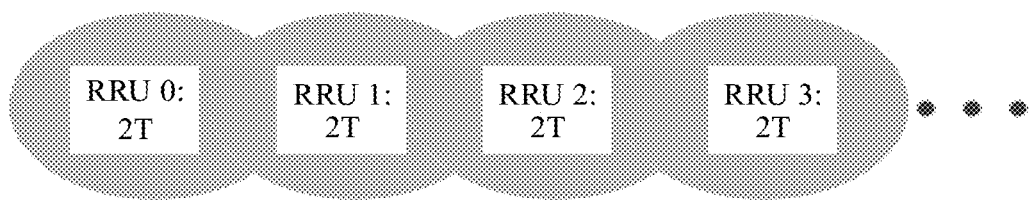
FIG. 2A is a schematic diagram of a cell network with a linear arrangement.

FIG. 2A is a schematic diagram of a cell network with a linear arrangement. As shown in FIG. 2A, M cells are arranged linearly, and a base station serving each cell is provided with a remote radio unit (RRU). For ease of description, RRUs in the M cells that are arranged linearly are named as an RRU 0, an RRU 1, an RRU 2, an RRU 3, and the like. The RRU 1 is adjacent to the RRU 0 and the RRU 2, and the RRU 2 is adjacent to the RRU 1 and the RRU 3.

Figure 2B:
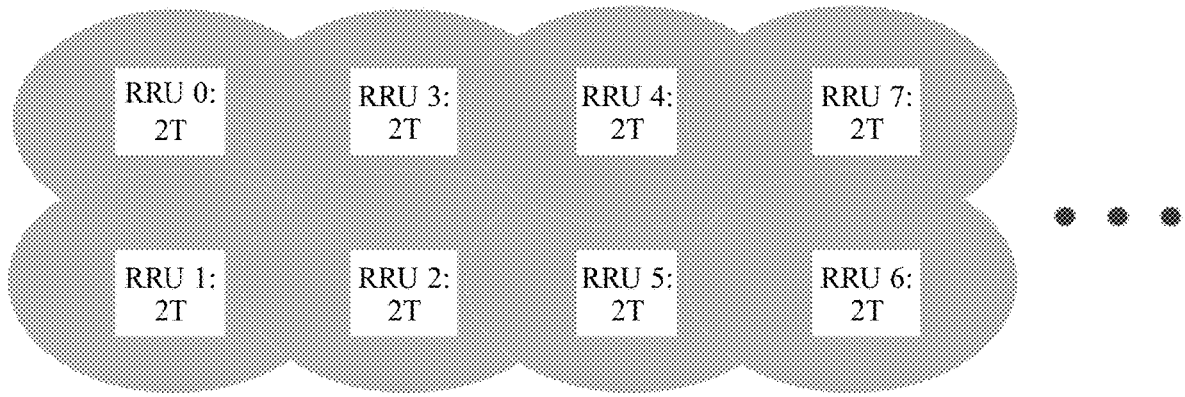
FIG. 2B is a schematic diagram of a cell network with a square arrangement.

FIG. 2B is a schematic diagram of a cell network with a square arrangement. As shown in FIG. 2B, M cells are arranged squarely, and a base station serving each cell is provided with an RRU. For ease of description, RRUs of the M cells that are arranged squarely are named as an RRU 0, an RRU 1, an RRU 2, an RRU 3, an R RU 4, an RRU 5, an RRU 6, an RRU 7, and the like. As shown in FIG. 2B, the RRU 0 is adjacent to the RRU 1 and the RRU 2, and the RRU 3 is adjacent to the RRU 1, the RRU 2, and the RRU 4.

Figure 3:
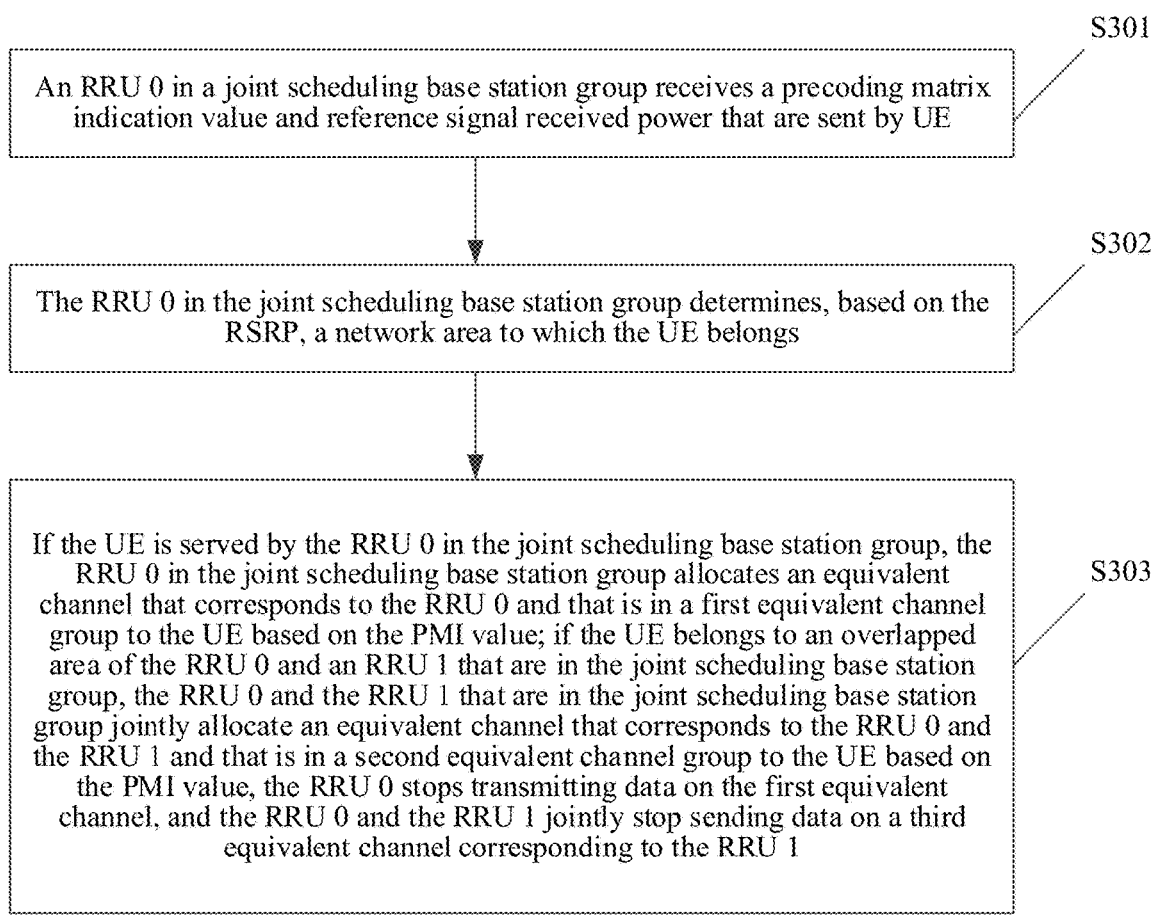
FIG. 3 is a schematic flowchart of a method for transmitting base station data according to an embodiment of this application.

FIG. 3 shows a method for transmitting base station data according to an embodiment of this application. The method is performed by the base stations arranged linearly shown in FIG. 2A or the base stations arranged squarely shown in FIG. 2B, and the base stations arranged linearly may be referred to as a joint scheduling base station group. As shown in FIG. 3, the method includes the following operations.

Operation S301: An RRU 0 in the joint scheduling base station group receives a precoding matrix indication (PMI) value and reference signal received power (RSRP) that are sent by UE.

Operation S302: The RRU 0 in the joint scheduling base station group determines, based on the RSRP, a network area to which the UE belongs.

A specific method for determining, based on the RSRP, the network area to which the UE belongs may include: receiving, by the RRU 0, an RSRP value list sent by the UE; and if $RSRP_{max}$ is apparently greater than other RSRP values and a network area corresponding to $RSRP_{max}$ is an area covered by the RRU 0, determining that the UE belongs to the RRU 0; or if $RSRP_{max}$ and $RSRP_{max-1}$ (a second largest value) are apparently greater than other RSRP values, determining that a network area corresponding to $RSRP_{max}$ and $RSRP_{max-1}$ as an overlapped area of RRU 0 and RRU 1, that is, the network area in which the UE is located.

Operation S303: If the UE belongs to the RRU 0 in the joint scheduling base station group, the RRU 0 in the joint scheduling base station group allocates an equivalent channel that corresponds to the RRU 0 and that is in a first equivalent channel group to the UE based on the PMI value; and if the UE belongs to the overlapped area of the RRU 0 and the RRU 1 that are in the joint scheduling base station group, the RRU 0 and the RRU 1 that are in the joint scheduling base station group jointly allocate an equivalent channel that corresponds to the RRU 0 and the RRU 1 and that is in a second equivalent channel group to the UE based on the PMI value, the RRU 0 stops transmitting data on the first equivalent channel, and the RRU 0 and the RRU 1 jointly stop sending data on a third equivalent channel corresponding to the RRU 1, where the first equivalent channel and a second equivalent channel have different radio frequency channels.

According to the method provided by the embodiment shown in FIG. 3, based on the PMI value reported by the UE, network areas are classified into a plurality of network area groups, and the network areas correspond to different equivalent channels. For the UE, different equivalent channels are used for different network area groups, for example, data is transmitted in the RRU 0 on a first equivalent channel, and data is transmitted in the RRU 1 on a third equivalent channel, and different radio frequency channels are allocated to the first equivalent channel and the third equivalent channel. Therefore, during data transmission on different radio frequency channels, interference between the RRU 0 and the RRU 1 that are adjacent to each other can well be avoided. In an overlapped network area group of the RRU 0 and the RRU 1, a joint transmission manner, that is, a second equivalent channel, is used to transmit data. That UE in the overlapped network area group is specifically in the overlapped area of the RRU 0 and the RRU 1 (that is, when the UE is in the overlapped area, a difference between RSRP 1 and RSRP 2 reported by the UE is relatively small, and the RSRP 1 and the RSRP 2 are the largest value and the second largest value in the RSRP) can be determined by using the RSRP reported by the UE. In this way, when the RRU 0 and the RRU 1 jointly allocate the second equivalent channel to the UE, the RRU 0 stops allocating the first equivalent channel, and the RRU 0 and the RRU 1 jointly stops allocating the second equivalent channel corresponding to the RRU 1. Because when the UE sends data on the second equivalent channel, RRUs (namely, the RRU 0 and the RRU 1) corresponding to network areas closer to the overlapped area stop allocating equivalent channels, the RRU 0 and the RRU 1 do not interfere with the overlapped area. As other network areas (network areas other than the RRU 0 and the RRU 1) are far away from the overlapped area that is of the RRU 0 and the RRU 1 and in which the UE is located, interference can be ignored.

Figure 4A:
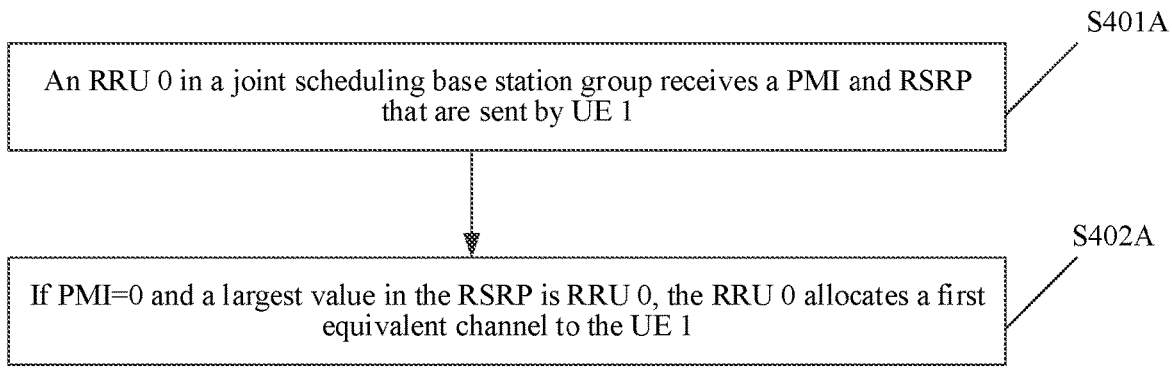
FIG. 4A is a schematic flowchart of a method for transmitting base station data according to another embodiment of this application.

FIG. 4A shows a method for transmitting base station data according to another embodiment of this application. The method is performed by the base station shown in FIG. 2A or FIG. 2B. The UE is an R8 terminal and is provided with four ports. As shown in FIG. 4A, the method includes the following operations.

Operation S401A: RRU 0 in a joint scheduling base station group receives a PMI and RSRP that are sent by UE 1.

Operation 402A: If PMI=0 and a largest value in the RSRP is RSRP of RRU 0, the RRU 0 allocates a first equivalent channel to the UE 1, and the first equivalent channel may be specifically:

$$[T_0 \ \ldots \ T_{2M-1}]V\frac{1}{2}\begin{bmatrix}1\\1\\1\\1\end{bmatrix} = [T_0 \ \ldots \ T_{2M-1}]\frac{1}{\sqrt{2}}\begin{bmatrix}1\\1\\0\\0\\1\\1\\0\\0\\\vdots\end{bmatrix},$$

where $T_{2M-1}$ is a $(2M)^{th}$ radio frequency channel, M is a quantity of radio frequency channels, and the ellipsis in a matrix with four port numbers represents 2M-8 omitted digits. The 2M-8 digits are rows that are repeated in the foregoing matrix, and the rows indicates repeated digits in the first to the fourth rows, namely, 1100, where $$V = \frac{1}{\sqrt{2}}\begin{bmatrix}1 & 0 & 1 & 0\\0 & 1 & 0 & 1\\j & 0 & -j & 0\\0 & j & 0 & -j\\1 & 0 & 1 & 0\\0 & 1 & 0 & 1\\j & 0 & -j & 0\\0 & j & 0 & -j\\\vdots & \vdots & \vdots & \vdots\end{bmatrix}$$

The ellipsis in the matrix with four port numbers represents 2M-8 omitted digits, the 2M-8 digits are rows that are repeated in the foregoing matrix, and the rows indicates repeated digits in the first to the fourth rows.

When PMI=2, a second equivalent channel in a first channel group and allocated to the user equipment is:

$$[T_0 \ \ldots \ T_{2M-1}]V\frac{1}{2}\begin{bmatrix}1\\-1\\1\\-1\end{bmatrix} = [T_0 \ \ldots \ T_{2M-1}]\frac{1}{\sqrt{2}}\begin{bmatrix}1\\-1\\0\\0\\1\\-1\\0\\0\\\vdots\end{bmatrix}.$$

When PMI=9, a third equivalent channel in the first channel group and allocated to the user equipment is:

$$[T_0 \ \ldots \ T_{2M-1}]V\frac{1}{2}\begin{bmatrix}1\\j\\0\\0\\1\\j\\0\\0\\\vdots\end{bmatrix} = [T_0 \ \ldots \ T_{2M-1}]\frac{1}{\sqrt{2}}\begin{bmatrix}1\\j\\0\\0\\1\\j\\0\\0\\\vdots\end{bmatrix}.$$

When PMI=11, a fourth equivalent channel in the first channel group and allocated to the user equipment is:

$$[T_0 \ \ldots \ T_{2M-1}]V\frac{1}{2}\begin{bmatrix}1\\-j\\1\\-j\end{bmatrix} = [T_0 \ \ldots \ T_{2M-1}]\frac{1}{\sqrt{2}}\begin{bmatrix}1\\-j\\0\\0\\1\\-j\\0\\0\\\vdots\end{bmatrix}.$$

When PMI=1, a fifth equivalent channel in the first channel group and allocated to the user equipment is:

$$[T_0 \ \ldots \ T_{2M-1}]V\frac{1}{2}\begin{bmatrix}1\\j\\-1\\-j\end{bmatrix} = [T_0 \ \ldots \ T_{2M-1}]\frac{1}{\sqrt{2}}\begin{bmatrix}0\\0\\j\\-1\\0\\0\\j\\-1\\\vdots\end{bmatrix}.$$

When PMI=3, a sixth equivalent channel in the first channel group and allocated to the user equipment is:

$$[T_0 \ \ldots \ T_{2M-1}]V\frac{1}{2}\begin{bmatrix}1\\-j\\-1\\j\end{bmatrix} = [T_0 \ \ldots \ T_{2M-1}]\frac{1}{\sqrt{2}}\begin{bmatrix}0\\0\\j\\1\\0\\0\\j\\1\\\vdots\end{bmatrix}.$$

When PMI=8, a seventh equivalent channel in the first channel group and allocated to the user equipment is:

$$[T_0 \ \ldots \ T_{2M-1}]V\frac{1}{2}\begin{bmatrix}1\\1\\-1\\-1\end{bmatrix} = [T_0 \ \ldots \ T_{2M-1}]\frac{1}{\sqrt{2}}\begin{bmatrix}0\\0\\1\\1\\0\\0\\1\\1\\\vdots\end{bmatrix}.$$

When PMI=10, an eighth equivalent channel in the first channel group and allocated to the user equipment is:

$$[T_0 \ \ldots \ T_{2M-1}]V\frac{1}{2}\begin{bmatrix}1\\-1\\-1\\1\end{bmatrix} = [T_0 \ \ldots \ T_{2M-1}]\frac{1}{\sqrt{2}}\begin{bmatrix}0\\0\\1\\-1\\0\\0\\1\\-1\\\vdots\end{bmatrix}.$$

Figure 4B:
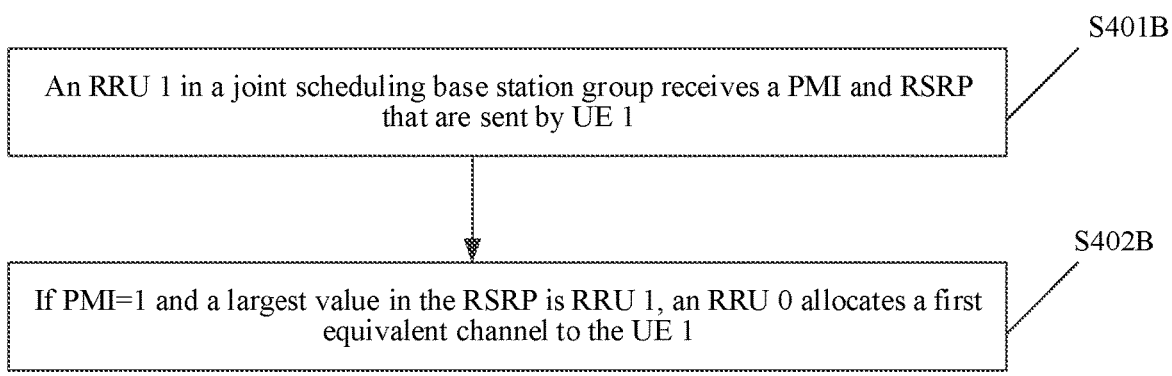
FIG. 4B is a schematic flowchart of another method for transmitting base station data according to another embodiment of this application.

FIG. 4B shows another method for transmitting base station data according to another embodiment of this application. The method is performed by the base station shown in FIG. 2A or FIG. 2B. The UE is an R8 terminal and is provided with four ports. As shown in FIG. 4B, the method includes the following operations.

Operation S401B: RRU 1 in a joint scheduling base station group receives a PMI and RSRP that are sent by UE 1.

Operation S402B: If PMI=4 and a largest value in the RSRP is RSRP of RRU 1, the RRU 1 allocates an equivalent channel in a first channel group to the UE 1, and the equivalent channel may be specifically:

$$[T_0 \ \ldots \ T_{2M-1}]V\frac{1}{2}\begin{bmatrix}1\\\frac{1}{\sqrt{2}}(1+j)\\j\\-\frac{1}{\sqrt{2}}(1-j)\end{bmatrix} = [T_0 \ \ldots \ T_{2M-1}]\frac{1}{\sqrt{2}}\begin{bmatrix}\frac{1}{2}(1+j)\\\frac{1}{\sqrt{2}}j\\\frac{1}{2}(1+j)\\\frac{1}{\sqrt{2}}j\\\frac{1}{2}(1+j)\\\frac{1}{\sqrt{2}}j\\\frac{1}{2}(1+j)\\\frac{1}{\sqrt{2}}j\\\vdots\end{bmatrix},$$

where $T_{2M-1}$ is a $(2M)^{th}$ radio frequency channel, M is a quantity of radio frequency channels, and the ellipsis represents omitted digits in the first to the fourth rows of a matrix.

If PMI=4, a ninth equivalent channel in a second channel group and allocated to the user equipment is:

$$[T_0 \ \ldots \ T_{2M-1}]V\frac{1}{2}\begin{bmatrix}1\\ \frac{1}{\sqrt{2}}(1+j)\\ j\\ -\frac{1}{\sqrt{2}}(1-j)\end{bmatrix} = [T_0 \ \ldots \ T_{2M-1}]\frac{1}{\sqrt{2}}\begin{bmatrix}\frac{1}{2}(1+j)\\ \frac{1}{\sqrt{2}}j\\ \frac{1}{2}(1+j)\\ \frac{1}{\sqrt{2}}j\\ \frac{1}{2}(1+j)\\ \frac{1}{\sqrt{2}}j\\ \frac{1}{2}(1+j)\\ \frac{1}{\sqrt{2}}j\\ \vdots\end{bmatrix},$$

where $T_{2M-1}$ is a $(2M)^{th}$ network area, V is a port mapping matrix of the user equipment, and the ellipsis represents 2M-8 repeated digits.

When PMI=5, a tenth equivalent channel in the second channel group and allocated to the user equipment is:

$$[T_0 \ \ldots \ T_{2M-1}]V\frac{1}{2}\begin{bmatrix}1\\ -\frac{1}{\sqrt{2}}(1+j)\\ j\\ \frac{1}{\sqrt{2}}(1-j)\end{bmatrix} = [T_0 \ \ldots \ T_{2M-1}]\frac{1}{\sqrt{2}}\begin{bmatrix}\frac{1}{2}(1+j)\\ -\frac{1}{\sqrt{2}}j\\ \frac{1}{2}(1+j)\\ -\frac{1}{\sqrt{2}}j\\ \frac{1}{2}(1+j)\\ -\frac{1}{\sqrt{2}}j\\ \vdots\end{bmatrix}.$$

When PMI=6, an eleventh equivalent channel in the second channel group and allocated to the user equipment is:

$$[T_0 \ \ldots \ T_{2M-1}]V\frac{1}{2}\begin{bmatrix}1\\ \frac{1}{\sqrt{2}}(1-j)\\ -j\\ -\frac{1}{\sqrt{2}}(1+j)\end{bmatrix} = [T_0 \ \ldots \ T_{2M-1}]\frac{1}{\sqrt{2}}\begin{bmatrix}\frac{1}{2}(1-j)\\ -\frac{1}{\sqrt{2}}j\\ \frac{1}{2}(1-j)\\ \frac{1}{\sqrt{2}}j\\ \frac{1}{2}(1-j)\\ -\frac{1}{\sqrt{2}}j\\ \vdots\end{bmatrix}.$$

When PMI=7, a twelfth equivalent channel in the second channel group and allocated to the user equipment is:

$$[T_0 \ \ldots \ T_{2M-1}]V\frac{1}{2}\begin{bmatrix}1\\ \frac{1}{\sqrt{2}}(1-j)\\ -j\\ -\frac{1}{\sqrt{2}}(1+j)\end{bmatrix} = [T_0 \ \ldots \ T_{2M-1}]\frac{1}{\sqrt{2}}\begin{bmatrix}\frac{1}{2}(1-j)\\ -\frac{1}{\sqrt{2}}j\\ \frac{1}{2}(1-j)\\ \frac{1}{\sqrt{2}}j\\ \frac{1}{2}(1-j)\\ -\frac{1}{\sqrt{2}}j\\ \frac{1}{2}(1-j)\\ \frac{1}{\sqrt{2}}j\\ \vdots\end{bmatrix}.$$

When PMI=12, a thirteenth equivalent channel in the second channel group and allocated to the user equipment is:

$$[T_0 \ \ldots \ T_{2M-1}]V\frac{1}{2}\begin{bmatrix}1\\ 1\\ 1\\ -1\end{bmatrix} = [T_0 \ \ldots \ T_{2M-1}]\frac{1}{\sqrt{2}}\begin{bmatrix}1\\ 0\\ 0\\ j\\ 1\\ 0\\ 0\\ j\\ \vdots\end{bmatrix}.$$

When PMI=13, a fourteenth equivalent channel in the second channel group and allocated to the user equipment is:

When PMI=14, a fifteenth equivalent channel in the second channel group and allocated to the user equipment is:

$$[T_0 \ \ldots \ T_{2M-1}]V\frac{1}{2}\begin{bmatrix}1\\1\\-1\\1\end{bmatrix} = [T_0 \ \ldots \ T_{2M-1}]\frac{1}{\sqrt{2}}\begin{bmatrix}0\\1\\j\\0\\0\\1\\j\\0\\\vdots\end{bmatrix}.$$

When PMI=15, a sixteenth equivalent channel in the second channel group and allocated to the user equipment is:

$$[T_0 \ \ldots \ T_{2M-1}]V\frac{1}{2}\begin{bmatrix}-1\\1\\1\\1\end{bmatrix} = [T_0 \ \ldots \ T_{2M-1}]\frac{1}{\sqrt{2}}\begin{bmatrix}0\\1\\-j\\0\\0\\1\\-j\\0\\\vdots\end{bmatrix}.$$

When PMI=15, a sixteenth equivalent channel in the second channel group and allocated to the user equipment is:

$$[T_0 \ \ldots \ T_{2M-1}]V\frac{1}{2}\begin{bmatrix}1\\-1\\-1\\-1\end{bmatrix} = [T_0 \ \ldots \ T_{2M-1}]\frac{1}{\sqrt{2}}\begin{bmatrix}0\\-1\\j\\0\\0\\-1\\j\\0\\\vdots\end{bmatrix}.$$

Figure 5:
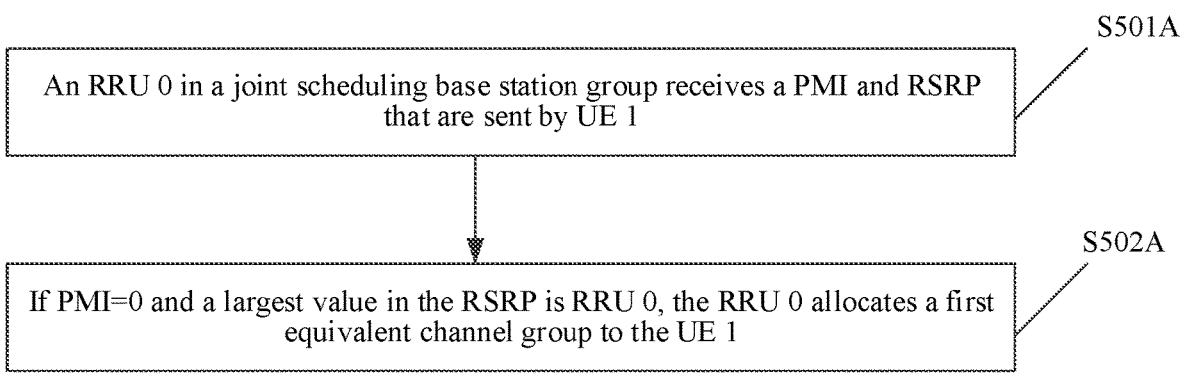
FIG. 5 is a schematic flowchart of a method for transmitting base station data according to still another embodiment of this application.

FIG. 5 shows a method for transmitting base station data according to still another embodiment of this application. The method is performed by the base station shown in FIG. 2B. The UE is an R10 terminal and is provided with eight ports. As shown in FIG. 5, the method includes the following operations.

Operation S501A: RRU 0 in a joint scheduling base station group receives a PMI and RSRP that are sent by UE 1.

Operation S502A: If PMI=0, and a largest value in the RSRP is RSRP of RRU 0, the RRU 0 allocates a first equivalent channel to the UE 1, and the seventeenth equivalent channel may be specifically:

$$[T_0 \ \ldots \ T_{2M-1}]V\frac{1}{\sqrt{8}}\begin{bmatrix}1\\1\\1\\1\\1\\1\\1\\1\end{bmatrix} = [T_0 \ \ldots \ T_{2M-1}]V\frac{1}{\sqrt{2}}\begin{bmatrix}1\\1\\0\\0\\1\\1\\0\\0\\\vdots\end{bmatrix},$$

where $T_{2M-1}$ is a $(2M)^{th}$ radio frequency channel, M is a quantity of radio frequency channels, and the ellipsis represents omitted digits in the first to the eighth rows of a matrix:

$$V = \frac{1}{2}\begin{bmatrix}1 & 0 & 1 & 0 & 1 & 0 & 1 & 0\\0 & 1 & 0 & 1 & 0 & 1 & 0 & 1\\j & 0 & -j & 0 & 1 & 0 & -1 & 0\\0 & j & 0 & -j & 0 & 1 & 0 & -1\\1 & 0 & 1 & 0 & 1 & 0 & 1 & 0\\0 & 1 & 0 & 1 & 0 & 1 & 0 & 1\\j & 0 & -j & 0 & 1 & 0 & -1 & 0\\0 & j & 0 & -j & 0 & 1 & 0 & -1\\\vdots & \vdots & \vdots & & & \vdots & &\end{bmatrix},$$

where

V is a matrix with eight ports, and the ellipsis represents omitted digits in the first to the eighth rows of V.

If PMI=7, an eighteenth equivalent channel in a first channel group and allocated to the user equipment is:

$$[T_0 \ \ldots \ T_{2M-1}]V\frac{1}{\sqrt{8}}\begin{bmatrix}1\\1\\1\\1\\j\\j\\j\\j\end{bmatrix} = [T_0 \ \ldots \ T_{2M-1}]V\frac{1}{\sqrt{2}}\begin{bmatrix}1\\1\\0\\0\\j\\j\\0\\0\\\vdots\end{bmatrix};$$

if PMI=8, a nineteenth equivalent channel in the first channel group and allocated to the user equipment is:

$$[T_0 \ \ldots \ T_{2M-1}]V\frac{1}{\sqrt{8}}\begin{bmatrix}1\\1\\1\\1\\-1\\-1\\-1\\-1\end{bmatrix} = [T_0 \ \ldots \ T_{2M-1}]V\frac{1}{\sqrt{2}}\begin{bmatrix}1\\1\\0\\0\\-1\\-1\\0\\0\\\vdots\end{bmatrix};$$

if PMI=16, a twentieth equivalent channel in the first channel group and allocated to the user equipment is:

$$[T_0 \ \ldots \ T_{2M-1}]V\frac{1}{\sqrt{8}}\begin{bmatrix}1\\1\\1\\1\\-j\\-j\\-j\\-j\end{bmatrix}=[T_0 \ \ldots \ T_{2M-1}]V\frac{1}{\sqrt{2}}\begin{bmatrix}1\\1\\0\\0\\-j\\-j\\0\\0\\\vdots\end{bmatrix};$$

$$[T_0 \ \ldots \ T_{2M-1}]V\frac{1}{\sqrt{8}}\begin{bmatrix}1\\-1\\1\\-1\\-j\\j\\-j\\j\end{bmatrix}=[T_0 \ \ldots \ T_{2M-1}]V\frac{1}{\sqrt{2}}\begin{bmatrix}1\\-1\\0\\0\\-j\\j\\0\\0\\\vdots\end{bmatrix};$$

if PMI=36, a twenty-first equivalent channel in the first channel group and allocated to the user equipment is:

$$[T_0 \ \ldots \ T_{2M-1}]V\frac{1}{\sqrt{8}}\begin{bmatrix}1\\-1\\1\\-1\\1\\-1\\1\\-1\end{bmatrix}=[T_0 \ \ldots \ T_{2M-1}]V\frac{1}{\sqrt{2}}\begin{bmatrix}1\\-1\\0\\0\\1\\-1\\0\\0\\\vdots\end{bmatrix};$$

if PMI=1, a twenty-fifth equivalent channel in the first channel group and allocated to the user equipment is:

$$[T_0 \ \ldots \ T_{2M-1}]V\frac{1}{\sqrt{8}}\begin{bmatrix}1\\j\\-1\\-j\\1\\j\\-1\\-j\end{bmatrix}=[T_0 \ \ldots \ T_{2M-1}]V\frac{1}{\sqrt{2}}\begin{bmatrix}0\\0\\j\\-1\\0\\0\\j\\-1\\\vdots\end{bmatrix};$$

if PMI=44, a twenty-second equivalent channel in the first channel group and allocated to the user equipment is:

$$[T_0 \ \ldots \ T_{2M-1}]V\frac{1}{\sqrt{8}}\begin{bmatrix}1\\-1\\1\\-1\\-1\\1\\-1\\1\end{bmatrix}=[T_0 \ \ldots \ T_{2M-1}]V\frac{1}{\sqrt{2}}\begin{bmatrix}1\\-1\\0\\0\\-1\\1\\0\\0\\\vdots\end{bmatrix};$$

if PMI=3, a twenty-sixth equivalent channel in the first channel group and allocated to the user equipment is:

$$[T_0 \ \ldots \ T_{2M-1}]V\frac{1}{\sqrt{8}}\begin{bmatrix}1\\j\\-1\\-j\\j\\-1\\-j\\1\end{bmatrix}=[T_0 \ \ldots \ T_{2M-1}]V\frac{1}{\sqrt{2}}\begin{bmatrix}0\\0\\j\\-1\\0\\0\\-1\\-j\\\vdots\end{bmatrix};$$

if PMI=72, a twenty-third equivalent channel in the first channel group and allocated to the user equipment is:

$$[T_0 \ \ldots \ T_{2M-1}]V\frac{1}{\sqrt{8}}\begin{bmatrix}1\\-1\\1\\-1\\j\\-j\\j\\-j\end{bmatrix}=[T_0 \ \ldots \ T_{2M-1}]V\frac{1}{\sqrt{2}}\begin{bmatrix}1\\-1\\0\\0\\j\\-j\\0\\0\\\vdots\end{bmatrix};$$

if PMI=6, a twenty-seventh equivalent channel in the first channel group and allocated to the user equipment is:

$$[T_0 \ \ldots \ T_{2M-1}]V\frac{1}{\sqrt{8}}\begin{bmatrix}1\\j\\-1\\-j\\-1\\-j\\1\\j\end{bmatrix}=[T_0 \ \ldots \ T_{2M-1}]V\frac{1}{\sqrt{2}}\begin{bmatrix}0\\0\\j\\-1\\0\\0\\-j\\1\\\vdots\end{bmatrix};$$

if PMI=88, a twenty-fourth equivalent channel in the first channel group and allocated to the user equipment is:

if PMI=12, a twenty-eighth equivalent channel in the first channel group and allocated to the user equipment is:

$$[T_0 \ldots T_{2M-1}]V\frac{1}{\sqrt{8}}\begin{bmatrix}1\\j\\-1\\-j\\j\\-1\\-j\\1\end{bmatrix} = [T_0 \ldots T_{2M-1}]V\frac{1}{\sqrt{2}}\begin{bmatrix}0\\0\\j\\-1\\0\\0\\1\\j\\\vdots\end{bmatrix};$$

if PMI=17, a twenty-ninth equivalent channel in the first channel group and allocated to the user equipment is:

$$[T_0 \ldots T_{2M-1}]V\frac{1}{\sqrt{8}}\begin{bmatrix}1\\-j\\-1\\j\\1\\-j\\-1\\j\end{bmatrix} = [T_0 \ldots T_{2M-1}]V\frac{1}{\sqrt{2}}\begin{bmatrix}0\\0\\j\\1\\0\\0\\j\\1\\\vdots\end{bmatrix};$$

if PMI=20, a thirtieth equivalent channel in the first channel group and allocated to the user equipment is:

$$[T_0 \ldots T_{2M-1}]V\frac{1}{\sqrt{8}}\begin{bmatrix}1\\-j\\-1\\j\\j\\1\\-j\\-1\end{bmatrix} = [T_0 \ldots T_{2M-1}]V\frac{1}{\sqrt{2}}\begin{bmatrix}0\\0\\j\\1\\0\\0\\-1\\j\\\vdots\end{bmatrix};$$

if PMI=32, a thirty-first equivalent channel in the first channel group and allocated to the user equipment is:

$$[T_0 \ldots T_{2M-1}]V\frac{1}{\sqrt{8}}\begin{bmatrix}1\\-j\\-1\\j\\-1\\j\\1\\-j\end{bmatrix} = [T_0 \ldots T_{2M-1}]V\frac{1}{\sqrt{2}}\begin{bmatrix}0\\0\\j\\1\\0\\0\\-j\\-1\\\vdots\end{bmatrix};$$

and if PMI=40, a thirty-second equivalent channel in the first channel group and allocated to the user equipment is:

$$[T_0 \ldots T_{2M-1}]V\frac{1}{\sqrt{8}}\begin{bmatrix}1\\-j\\-1\\j\\-j\\-1\\j\\1\end{bmatrix} = [T_0 \ldots T_{2M-1}]V\frac{1}{\sqrt{2}}\begin{bmatrix}0\\0\\j\\1\\0\\0\\1\\-j\\\vdots\end{bmatrix}.$$

For the eight ports, other PMI values are equivalent channels in a second channel group of an overlapped area, and the second channel group includes 112 equivalent channels, which are not enumerated herein. For the equivalent channels in the second channel group, with a digit change of the matrix with eight ports, for example, a matrix 1 with eight ports is changed to a matrix 2 with eight ports (which is only an example, and is one of 112 matrices with eight ports in the overlapped area), an equivalent channel corresponding to matrix with eight ports can be calculated based on the foregoing formula.

Matrix 1 with eight ports $$\begin{bmatrix}1\\-j\\-1\\j\\-j\\-1\\j\\1\end{bmatrix}$$

Figure 6:
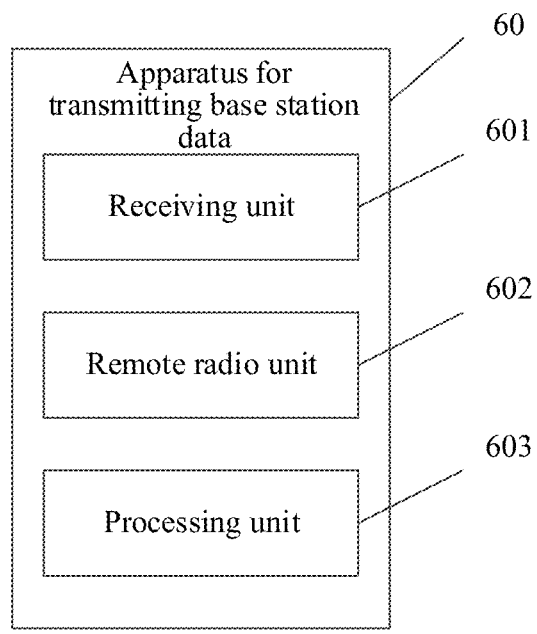
FIG. 6 is a schematic structural diagram of an apparatus for transmitting base station data according to an embodiment of this application.

FIG. 6 shows an apparatus 60 for

Matrix 2 with eight ports $$\begin{bmatrix}1\\\frac{1}{\sqrt{8}}(1-j)\\-j\\-\frac{1}{\sqrt{8}}(1+j)\\-j\\-\frac{1}{\sqrt{8}}(1+j)\\j\\\frac{1}{\sqrt{8}}(1-j)\end{bmatrix}$$

transmitting base station data according to one embodiment. The apparatus is deployed in a first base station in a joint scheduling base station group and includes:

a receiving unit 601, configured to receive a precoding matrix indication PMI value and reference signal received power RSRP that are sent by user equipment;

a remote radio unit 602, configured to: determine, based on the RSRP, a network area to which the UE belongs; and a processing unit 603, configured to: if the UE is served by the first base station in the joint scheduling base station group, allocate an equivalent channel that corresponds to the first base station and that is in a first equivalent channel group to the UE based on the PMI value; if the UE belongs to an overlapped area of the first base station and a second base station that are in the joint scheduling base station group, allocate an equivalent channel that corresponds to the first base station and the second base station and that is in a second equivalent channel group to the UE based on the PMI value, stop transmitting data on the first equivalent channel, and stop sending data on a third equivalent channel corresponding to the second base station, where the first equivalent channel group and the second equivalent channel group have different radio frequency channels.

Figure 7:
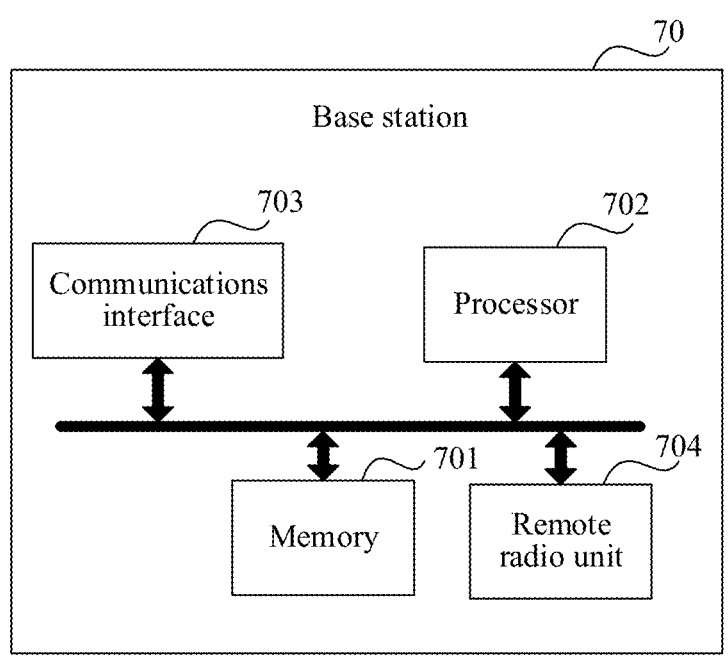
FIG. 7 is a schematic structural diagram of a base station according to an embodiment of this application.

FIG. 7 shows a base station 70 according to one embodiment of this application. The base station is a base station in a joint scheduling base station group and includes a communications interface 701, a memory 702, a processor 703, and a remote radio unit 704. The communications interface 701, the memory 702, the processor 703, and the remote radio unit 704 are connected, and specifically may be connected by using a bus.

The communications interface 701 is configured to receive a precoding matrix indication PMI value and reference signal received power RSRP that are sent by user equipment.

The remote radio unit 704 is configured to determine, based on the RSRP, a network area to which the UE belongs.

The processor 703 is configured to: if the UE is served by the base station in the joint scheduling base station group, allocate an equivalent channel that corresponds to the base station and that is in a first equivalent channel group to the UE based on the PMI value; and if the UE belongs to an overlapped area of the base station and another base station that are in the joint scheduling base station group, allocate an equivalent channel that corresponds to the base station and the another base station and that is in a second equivalent channel group to the UE based on the PMI value, stop, by the base station, transmitting data on the first equivalent channel, and jointly stop, by the base station and the another base station, sending data on a third equivalent channel corresponding to the another base station, where the first equivalent channel group and the second equivalent channel group have different radio frequency channels.

This application, in some embodiments, further provides a computer-readable storage medium, storing a computer program used to exchange electronic data, where the computer program enables a computer to perform the method provided in FIG. 3, FIG. 4A or FIG. 4B.

This application, in some embodiments, further provides a computer program product, including a non-transitory computer-readable storage medium that stores a computer program, where the computer program is run to enable a computer to perform the method provided in FIG. 3, FIG. 4A or FIG. 4B.

It should be noted that, for brief description, all the foregoing method embodiments are expressed as a series of action combinations. However, a person skilled in the art should appreciate that this application is not limited to the described action sequence, because according to this application, some operations may be performed in other sequences or performed simultaneously. In addition, a person skilled in the art should also appreciate that all the embodiments described in this specification are example embodiments, and the related actions and modules are not necessarily mandatory to this application.

In the foregoing embodiments, the descriptions of the embodiment have respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is merely an example. For example, the unit division is merely a logical function division and may be another division in an actual implementation. For example, a plurality of units or components may be combined or integrated into another system, or some features may be ignored or not performed. In addition, the displayed or discussed mutual couplings or direct couplings or communication connections may be implemented through some interfaces. Indirect couplings or communication connections between the apparatuses or units may be implemented in electronic or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of this application essentially, or the part contributing to the prior art, or all or some of the technical solutions may be implemented in the form of a software product. The software product is stored in a memory and includes several instructions for instructing a computer device (which may be a personal computer, a server, a network device, or the like) to perform all or some of the operations of the methods described in the embodiments of this application. The foregoing memory includes any medium that can store a program code, such as a USB flash drive, a read-only memory (ROM), a random access memory (RAM), a removable hard disk, a magnetic disk, or an optical disc.

What is disclosed above is merely an example embodiment of this application, and certainly is not intended to limit the scope of the claims of this application. A person of ordinary skill in the art may understand that all or some of processes that implement the foregoing embodiments and equivalent modifications made in accordance with the claims of this application shall fall within the scope of this application.

What is claimed is:

1. A method for scheduling a terminal, comprising:
receiving, by a first base station in a joint scheduling base station group, a precoding matrix indication (PMI) value and reference signal received power (RSRP) that are sent by user equipment (UE);
determining, by a remote radio of the first base station in the joint scheduling base station group, based on the RSRP, a network area to which the UE belongs;
if the UE is served by the first base station in the joint scheduling base station group, allocating, by the first base station in the joint scheduling base station group, an equivalent channel that corresponds to the first base station and that is in a first equivalent channel group to the UE based on the PMI value;

if the UE belongs to an overlapped area of the first base station and a second base station that are in the joint scheduling base station group, jointly allocating, by the first base station and the second base station that are in the joint scheduling base station group, an equivalent channel that corresponds to the first base station and the second base station and that is in a second equivalent channel group to the UE based on the PMI value, stopping, by the first base station, transmitting data on the equivalent channel that corresponds to the first base station and that is in the first equivalent channel group, and jointly stopping, by the first base station and the second base station, sending data on another equivalent channel corresponding to the second base station, wherein the first equivalent channel group and the second equivalent channel group have different radio frequency channels.

2. The method according to claim 1, wherein if there are four port numbers for the UE, when PMI=0, a first equivalent channel in the first channel group and allocated to the user equipment is:

$$[T_0 \ \ldots \ T_{2M-1}]V\frac{1}{2}\begin{bmatrix}1\\1\\1\\1\end{bmatrix} = [T_0 \ \ldots \ T_{2M-1}]\frac{1}{\sqrt{2}}\begin{bmatrix}1\\1\\0\\0\\1\\1\\0\\0\\\vdots\end{bmatrix}, \text{ wherein}$$

$T_{2M-1}$ is a $(2M)^{th}$ network area, and V is a port mapping matrix of the user equipment;

when PMI=2, a second equivalent channel in the first channel group and allocated to the user equipment is:

$$[T_0 \ \ldots \ T_{2M-1}]V\frac{1}{2}\begin{bmatrix}1\\-1\\1\\-1\end{bmatrix} = [T_0 \ \ldots \ T_{2M-1}]\frac{1}{\sqrt{2}}\begin{bmatrix}1\\-1\\0\\0\\1\\-1\\0\\0\\\vdots\end{bmatrix};$$

when PMI=9, a third equivalent channel in the first channel group and allocated to the user equipment is:

$$[T_0 \ \ldots \ T_{2M-1}]V\frac{1}{2}\begin{bmatrix}1\\j\\1\\j\end{bmatrix} = [T_0 \ \ldots \ T_{2M-1}]\frac{1}{\sqrt{2}}\begin{bmatrix}1\\j\\0\\0\\1\\j\\0\\0\\\vdots\end{bmatrix};$$

when PMI=11, a fourth equivalent channel in the first channel group and allocated to the user equipment is:

$$[T_0 \ \ldots \ T_{2M-1}]V\frac{1}{2}\begin{bmatrix}1\\-j\\1\\-j\end{bmatrix} = [T_0 \ \ldots \ T_{2M-1}]\frac{1}{\sqrt{2}}\begin{bmatrix}1\\-j\\0\\0\\1\\-j\\0\\0\\\vdots\end{bmatrix};$$

when PMI=1, a fifth equivalent channel in the first channel group and allocated to the user equipment is:

$$[T_0 \ \ldots \ T_{2M-1}]V\frac{1}{2}\begin{bmatrix}1\\j\\-1\\-j\end{bmatrix} = [T_0 \ \ldots \ T_{2M-1}]\frac{1}{\sqrt{2}}\begin{bmatrix}0\\0\\j\\-1\\0\\0\\j\\-1\\\vdots\end{bmatrix};$$

when PMI=3, a sixth equivalent channel in the first channel group and allocated to the user equipment is:

$$[T_0 \ \ldots \ T_{2M-1}]V\frac{1}{2}\begin{bmatrix}1\\-j\\-1\\j\end{bmatrix} = [T_0 \ \ldots \ T_{2M-1}]\frac{1}{\sqrt{2}}\begin{bmatrix}0\\0\\j\\1\\0\\0\\j\\1\\\vdots\end{bmatrix};$$

when PMI=8, a seventh equivalent channel in the first channel group and allocated to the user equipment is:

$$[T_0 \ldots T_{2M-1}]V\frac{1}{2}\begin{bmatrix}1\\1\\-1\\-1\end{bmatrix} = [T_0 \ldots T_{2M-1}]\frac{1}{\sqrt{2}}\begin{bmatrix}0\\0\\1\\1\\0\\0\\1\\1\\\vdots\end{bmatrix};$$

and when PMI=10, an eighth equivalent channel in the first channel group and allocated to the user equipment is:

$$[T_0 \ldots T_{2M-1}]V\frac{1}{2}\begin{bmatrix}1\\-1\\-1\\1\end{bmatrix} = [T_0 \ldots T_{2M-1}]\frac{1}{\sqrt{2}}\begin{bmatrix}0\\0\\1\\-1\\0\\0\\1\\-1\\\vdots\end{bmatrix}.$$

3. The method according to claim 2, wherein if there are four port numbers for the UE, and if PMI=4, a ninth equivalent channel in the second channel group and allocated to the user equipment is:

$$[T_0 \ldots T_{2M-1}]V\frac{1}{2}\begin{bmatrix}1\\\frac{1}{\sqrt{2}}(1+j)\\j\\-\frac{1}{\sqrt{2}}(1-j)\end{bmatrix} = [T_0 \ldots T_{2M-1}]V\frac{1}{\sqrt{2}}\begin{bmatrix}\frac{1}{2}(1+j)\\\frac{1}{\sqrt{2}}j\\\frac{1}{2}(1+j)\\\frac{1}{\sqrt{2}}j\\\frac{1}{2}(1+j)\\\frac{1}{\sqrt{2}}j\\\frac{1}{2}(1+j)\\\frac{1}{\sqrt{2}}j\\\vdots\end{bmatrix},$$

wherein when PMI=5, a tenth equivalent channel in the second channel group and allocated to the user equipment is:

$$[T_0 \ldots T_{2M-1}]V\frac{1}{2}\begin{bmatrix}1\\-\frac{1}{\sqrt{2}}(1-j)\\-j\\\frac{1}{\sqrt{2}}(1+j)\end{bmatrix} = [T_0 \ldots T_{2M-1}]V\frac{1}{\sqrt{2}}\begin{bmatrix}\frac{1}{2}(1-j)\\\frac{1}{\sqrt{2}}j\\\frac{1}{2}(1-j)\\-\frac{1}{\sqrt{2}}j\\\frac{1}{2}(1-j)\\\frac{1}{\sqrt{2}}j\\\frac{1}{2}(1-j)\\-\frac{1}{\sqrt{2}}j\\\vdots\end{bmatrix};$$

when PMI=6, an eleventh equivalent channel in the second channel group and allocated to the user equipment is:

$$[T_0 \ldots T_{2M-1}]V\frac{1}{2}\begin{bmatrix}1\\-\frac{1}{\sqrt{2}}(1+j)\\j\\\frac{1}{\sqrt{2}}(1-j)\end{bmatrix} = [T_0 \ldots T_{2M-1}]V\frac{1}{\sqrt{2}}\begin{bmatrix}\frac{1}{2}(1+j)\\-\frac{1}{\sqrt{2}}j\\\frac{1}{2}(1+j)\\-\frac{1}{\sqrt{2}}j\\\frac{1}{2}(1+j)\\-\frac{1}{\sqrt{2}}j\\\frac{1}{2}(1+j)\\-\frac{1}{\sqrt{2}}j\\\vdots\end{bmatrix};$$

when PMI=7, a twelfth equivalent channel in the second channel group and allocated to the user equipment is:

$$[T_0 \ldots T_{2M-1}]V\frac{1}{2}\begin{bmatrix}1\\\frac{1}{\sqrt{2}}(1-j)\\-j\\-\frac{1}{\sqrt{2}}(1+j)\end{bmatrix} = [T_0 \ldots T_{2M-1}]V\frac{1}{\sqrt{2}}\begin{bmatrix}\frac{1}{2}(1-j)\\-\frac{1}{\sqrt{2}}j\\\frac{1}{2}(1-j)\\\frac{1}{\sqrt{2}}j\\\frac{1}{2}(1-j)\\-\frac{1}{\sqrt{2}}j\\\frac{1}{2}(1-j)\\\frac{1}{\sqrt{2}}j\\\vdots\end{bmatrix};$$

when PMI=12, a thirteenth equivalent channel in the second channel group and allocated to the user equipment is:

$$[T_0 \ldots T_{2M-1}]V\frac{1}{2}\begin{bmatrix}1\\1\\1\\-1\end{bmatrix} = [T_0 \ldots T_{2M-1}]\frac{1}{\sqrt{2}}\begin{bmatrix}1\\0\\0\\j\\1\\0\\0\\j\\\vdots\end{bmatrix};$$

when PMI=13, a fourteenth equivalent channel in the second channel group and allocated to the user equipment is:

$$[T_0 \ldots T_{2M-1}]V\frac{1}{2}\begin{bmatrix}1\\1\\-1\\1\end{bmatrix} = [T_0 \ldots T_{2M-1}]\frac{1}{\sqrt{2}}\begin{bmatrix}0\\1\\j\\0\\0\\1\\j\\0\\\vdots\end{bmatrix};$$

when PMI=14, a fifteenth equivalent channel in the second channel group and allocated to the user equipment is:

$$[T_0 \ldots T_{2M-1}]V\frac{1}{2}\begin{bmatrix}-1\\1\\1\\1\end{bmatrix} = [T_0 \ldots T_{2M-1}]\frac{1}{\sqrt{2}}\begin{bmatrix}0\\1\\-j\\0\\0\\1\\-j\\0\\\vdots\end{bmatrix};$$

and
when PMI=15, a sixteenth equivalent channel in the second channel group and allocated to the user equipment is:

$$[T_0 \ldots T_{2M-1}]V\frac{1}{2}\begin{bmatrix}1\\-1\\-1\\-1\end{bmatrix} = [T_0 \ldots T_{2M-1}]\frac{1}{\sqrt{2}}\begin{bmatrix}0\\-1\\j\\0\\0\\-1\\j\\0\\\vdots\end{bmatrix}.$$

4. The method according to claim 3, wherein if there are eight ports for the UE, and
if PMI=0, a seventeenth equivalent channel in the first channel group and allocated to the user equipment is:

$$[T_0 \ldots T_{2M-1}]V\frac{1}{\sqrt{8}}\begin{bmatrix}1\\1\\1\\1\\1\\1\\1\\1\end{bmatrix} = [T_0 \ldots T_{2M-1}]\frac{1}{\sqrt{2}}\begin{bmatrix}1\\1\\0\\0\\1\\1\\0\\0\\\vdots\end{bmatrix},$$

wherein
if PMI=7, an eighteenth equivalent channel in the first channel group and allocated to the user equipment is:

$$[T_0 \ldots T_{2M-1}]V\frac{1}{\sqrt{8}}\begin{bmatrix}1\\1\\1\\1\\j\\j\\j\\j\end{bmatrix} = [T_0 \ldots T_{2M-1}]\frac{1}{\sqrt{2}}\begin{bmatrix}1\\1\\0\\0\\j\\j\\0\\0\\\vdots\end{bmatrix};$$

if PMI=8, a nineteenth equivalent channel in the first channel group and allocated to the user equipment is:

$$[T_0 \ldots T_{2M-1}]V\frac{1}{\sqrt{8}}\begin{bmatrix}1\\1\\1\\1\\-1\\-1\\-1\\-1\end{bmatrix} = [T_0 \ldots T_{2M-1}]\frac{1}{\sqrt{2}}\begin{bmatrix}1\\1\\0\\0\\-1\\-1\\0\\0\\\vdots\end{bmatrix},$$

if PMI=16, a twentieth equivalent channel in the first channel group and allocated to the user equipment is:

$$[T_0 \ldots T_{2M-1}]V\frac{1}{\sqrt{8}}\begin{bmatrix}1\\1\\1\\1\\-j\\-j\\-j\\-j\end{bmatrix} = [T_0 \ldots T_{2M-1}]V\frac{1}{\sqrt{2}}\begin{bmatrix}1\\1\\0\\0\\-j\\-j\\0\\0\\\vdots\end{bmatrix};$$

if PMI=36, a twenty-first equivalent channel in the first channel group and allocated to the user equipment is:

$$[T_0 \ \ldots \ T_{2M-1}]V\frac{1}{\sqrt{8}}\begin{bmatrix}1\\-1\\1\\-1\\1\\-1\\1\\-1\end{bmatrix} = [T_0 \ \ldots \ T_{2M-1}]V\frac{1}{\sqrt{2}}\begin{bmatrix}1\\-1\\0\\0\\1\\-1\\0\\0\\\vdots\end{bmatrix};$$

if PMI=44, a twenty-second equivalent channel in the first channel group and allocated to the user equipment is:

$$[T_0 \ \ldots \ T_{2M-1}]V\frac{1}{\sqrt{8}}\begin{bmatrix}1\\-1\\1\\-1\\-1\\1\\-1\\1\end{bmatrix} = [T_0 \ \ldots \ T_{2M-1}]V\frac{1}{\sqrt{2}}\begin{bmatrix}1\\-1\\0\\0\\-1\\1\\0\\0\\\vdots\end{bmatrix};$$

if PMI=72, a twenty-third equivalent channel in the first channel group and allocated to the user equipment is:

$$[T_0 \ \ldots \ T_{2M-1}]V\frac{1}{\sqrt{8}}\begin{bmatrix}1\\-1\\1\\-1\\j\\-j\\j\\-j\end{bmatrix} = [T_0 \ \ldots \ T_{2M-1}]V\frac{1}{\sqrt{2}}\begin{bmatrix}1\\-1\\0\\0\\j\\-j\\0\\0\\\vdots\end{bmatrix};$$

if PMI=88, a twenty-fourth equivalent channel in the first channel group and allocated to the user equipment is:

$$[T_0 \ \ldots \ T_{2M-1}]V\frac{1}{\sqrt{8}}\begin{bmatrix}1\\-1\\1\\-1\\-j\\j\\-j\\j\end{bmatrix} = [T_0 \ \ldots \ T_{2M-1}]V\frac{1}{\sqrt{2}}\begin{bmatrix}1\\-1\\0\\0\\-j\\j\\0\\0\\\vdots\end{bmatrix};$$

if PMI=1, a twenty-fifth equivalent channel in the first channel group and allocated to the user equipment is:

$$[T_0 \ \ldots \ T_{2M-1}]V\frac{1}{\sqrt{8}}\begin{bmatrix}1\\j\\-1\\-j\\1\\j\\-1\\-j\end{bmatrix} = [T_0 \ \ldots \ T_{2M-1}]V\frac{1}{\sqrt{2}}\begin{bmatrix}0\\0\\j\\-1\\0\\0\\j\\-1\\\vdots\end{bmatrix};$$

if PMI=3, a twenty-sixth equivalent channel in the first channel group and allocated to the user equipment is:

$$[T_0 \ \ldots \ T_{2M-1}]V\frac{1}{\sqrt{8}}\begin{bmatrix}1\\j\\-1\\-j\\j\\-1\\-j\\1\end{bmatrix} = [T_0 \ \ldots \ T_{2M-1}]V\frac{1}{\sqrt{2}}\begin{bmatrix}0\\0\\j\\-1\\0\\0\\-1\\-j\\\vdots\end{bmatrix};$$

if PMI=6, a twenty-seventh equivalent channel in the first channel group and allocated to the user equipment is:

$$[T_0 \ \ldots \ T_{2M-1}]V\frac{1}{\sqrt{8}}\begin{bmatrix}1\\j\\-1\\-j\\-1\\-j\\1\\j\end{bmatrix} = [T_0 \ \ldots \ T_{2M-1}]V\frac{1}{\sqrt{2}}\begin{bmatrix}0\\0\\j\\-1\\0\\0\\-j\\1\\\vdots\end{bmatrix};$$

if PMI=12, a twenty-eighth equivalent channel in the first channel group and allocated to the user equipment is:

$$[T_0 \ \ldots \ T_{2M-1}]V\frac{1}{\sqrt{8}}\begin{bmatrix}1\\j\\-1\\-j\\j\\-1\\-j\\1\end{bmatrix} = [T_0 \ \ldots \ T_{2M-1}]V\frac{1}{\sqrt{2}}\begin{bmatrix}0\\0\\j\\-1\\0\\0\\1\\j\\\vdots\end{bmatrix};$$

if PMI=17, a twenty-ninth equivalent channel in the first channel group and allocated to the user equipment is:

$$[T_0 \ \ldots \ T_{2M-1}]V\frac{1}{\sqrt{8}}\begin{bmatrix}1\\-j\\-1\\j\\1\\-j\\-1\\j\end{bmatrix} = [T_0 \ \ldots \ T_{2M-1}]V\frac{1}{\sqrt{2}}\begin{bmatrix}0\\0\\j\\1\\0\\0\\j\\1\\\vdots\end{bmatrix};$$

if PMI=20, a thirtieth equivalent channel in the first channel group and allocated to the user equipment is:

$$[T_0 \ \ldots \ T_{2M-1}]V\frac{1}{\sqrt{8}}\begin{bmatrix}1\\-j\\-1\\j\\j\\1\\-j\\-1\end{bmatrix} = [T_0 \ \ldots \ T_{2M-1}]V\frac{1}{\sqrt{2}}\begin{bmatrix}0\\0\\j\\1\\0\\0\\-1\\j\\\vdots\end{bmatrix};$$

if PMI=32, a thirty-first equivalent channel in the first channel group and allocated to the user equipment is:

$$[T_0 \ \ldots \ T_{2M-1}]V\frac{1}{\sqrt{8}}\begin{bmatrix}1\\-j\\-1\\j\\-1\\j\\1\\-j\end{bmatrix} = [T_0 \ \ldots \ T_{2M-1}]V\frac{1}{\sqrt{2}}\begin{bmatrix}0\\0\\j\\1\\0\\0\\-j\\-1\\\vdots\end{bmatrix};$$

and
if PMI=40, a thirty-second equivalent channel in the first channel group and allocated to the user equipment is:

$$[T_0 \ \ldots \ T_{2M-1}]V\frac{1}{\sqrt{8}}\begin{bmatrix}1\\-j\\-1\\j\\-j\\-1\\j\\1\end{bmatrix} = [T_0 \ \ldots \ T_{2M-1}]V\frac{1}{\sqrt{2}}\begin{bmatrix}0\\0\\j\\1\\0\\0\\1\\-j\\\vdots\end{bmatrix}.$$

5. An apparatus for transmitting base station data, wherein the apparatus is deployed in a first base station in a joint scheduling base station group and the apparatus comprises:

a receiver, configured to receive a precoding matrix indication (PMI) value and reference signal received power (RSRP) that are sent by user equipment (UE);

a remote radio, configured to determine, based on the RSRP, a network area to which the UE belongs; and a processor, configured to: if the UE is served by the first base station in the joint scheduling base station group, allocate an equivalent channel that corresponds to the first base station and that is in a first equivalent channel group to the UE based on the PMI value; and if the UE belongs to an overlapped area of the first base station and a second base station that are in the joint scheduling base station group, allocate an equivalent channel that corresponds to the first base station and the second base station and that is in a second equivalent channel group to the UE based on the PMI value, stop transmitting data on the equivalent channel that corresponds to the first base station and that is in the first equivalent channel group, and stop sending data on another equivalent channel corresponding to the second base station, wherein the first equivalent channel group and the second equivalent channel group have different radio frequency channels.

6. The apparatus according to claim 5, wherein if there are four port numbers for the UE, when PMI=0, a first equivalent channel in the first channel group and allocated to the user equipment is:

$$[T_0 \ \ldots \ T_{2M-1}]V\frac{1}{2}\begin{bmatrix}1\\1\\1\\1\end{bmatrix} = [T_0 \ \ldots \ T_{2M-1}]V\frac{1}{\sqrt{2}}\begin{bmatrix}1\\1\\0\\0\\1\\1\\0\\0\\\vdots\end{bmatrix},$$

wherein $T_{2M-1}$ is a $(2M)^{th}$ network area, and V is a port mapping matrix of the user equipment;

when PMI=2, a second equivalent channel in the first channel group and allocated to the user equipment is:

$$[T_0 \ \ldots \ T_{2M-1}]V\frac{1}{2}\begin{bmatrix}1\\-1\\1\\-1\end{bmatrix} = [T_0 \ \ldots \ T_{2M-1}]V\frac{1}{\sqrt{2}}\begin{bmatrix}1\\-1\\0\\0\\1\\-1\\0\\0\\\vdots\end{bmatrix};$$

when PMI=9, a third equivalent channel in the first channel group and allocated to the user equipment is:

$$[T_0 \ldots T_{2M-1}]V\frac{1}{2}\begin{bmatrix}1\\j\\1\\j\end{bmatrix} = [T_0 \ldots T_{2M-1}]\frac{1}{\sqrt{2}}\begin{bmatrix}1\\j\\0\\0\\1\\j\\0\\0\\\vdots\end{bmatrix};$$

when PMI=11, a fourth equivalent channel in the first channel group and allocated to the user equipment is:

$$[T_0 \ldots T_{2M-1}]V\frac{1}{2}\begin{bmatrix}1\\-j\\1\\-j\end{bmatrix} = [T_0 \ldots T_{2M-1}]\frac{1}{\sqrt{2}}\begin{bmatrix}1\\-j\\0\\0\\1\\-j\\0\\0\\\vdots\end{bmatrix};$$

when PMI=1, a fifth equivalent channel in the first channel group and allocated to the user equipment is:

$$[T_0 \ldots T_{2M-1}]V\frac{1}{2}\begin{bmatrix}1\\j\\-1\\-j\end{bmatrix} = [T_0 \ldots T_{2M-1}]\frac{1}{\sqrt{2}}\begin{bmatrix}0\\0\\j\\-1\\0\\0\\j\\-1\\\vdots\end{bmatrix};$$

when PMI=3, a sixth equivalent channel in the first channel group and allocated to the user equipment is:

$$[T_0 \ldots T_{2M-1}]V\frac{1}{2}\begin{bmatrix}1\\-j\\-1\\j\end{bmatrix} = [T_0 \ldots T_{2M-1}]\frac{1}{\sqrt{2}}\begin{bmatrix}0\\0\\j\\1\\0\\0\\j\\1\\\vdots\end{bmatrix};$$

when PMI=8, a seventh equivalent channel in the first channel group and allocated to the user equipment is:

$$[T_0 \ldots T_{2M-1}]V\frac{1}{2}\begin{bmatrix}1\\1\\-1\\-1\end{bmatrix} = [T_0 \ldots T_{2M-1}]\frac{1}{\sqrt{2}}\begin{bmatrix}0\\0\\1\\1\\0\\0\\1\\1\\\vdots\end{bmatrix};$$

and when PMI=10, an eighth equivalent channel in the first channel group and allocated to the user equipment is:

$$[T_0 \ldots T_{2M-1}]V\frac{1}{2}\begin{bmatrix}1\\-1\\-1\\1\end{bmatrix} = [T_0 \ldots T_{2M-1}]\frac{1}{\sqrt{2}}\begin{bmatrix}0\\0\\1\\-1\\0\\0\\1\\-1\\\vdots\end{bmatrix}.$$

7. The apparatus according to claim 6, wherein if there are four port numbers for the UE, and if PMI=4, a ninth equivalent channel in the second channel group and allocated to the user equipment is:

$$[T_0 \ldots T_{2M-1}]V\frac{1}{2}\begin{bmatrix}1\\\frac{1}{\sqrt{2}}(1+j)\\j\\-\frac{1}{\sqrt{2}}(1-j)\end{bmatrix} = [T_0 \ldots T_{2M-1}]\frac{1}{\sqrt{2}}\begin{bmatrix}\frac{1}{2}(1+j)\\\frac{1}{\sqrt{2}}j\\\frac{1}{2}(1+j)\\\frac{1}{\sqrt{2}}j\\\frac{1}{2}(1+j)\\\frac{1}{\sqrt{2}}j\\\frac{1}{2}(1+j)\\\frac{1}{\sqrt{2}}j\\\vdots\end{bmatrix},$$

wherein when PMI=5, a tenth equivalent channel in the second channel group and allocated to the user equipment is:

$$[T_0 \ldots T_{2M-1}]V\frac{1}{2}\begin{bmatrix} 1 \\ -\frac{1}{\sqrt{2}}(1-j) \\ -j \\ \frac{1}{\sqrt{2}}(1+j) \end{bmatrix} = [T_0 \ldots T_{2M-1}]\frac{1}{\sqrt{2}}\begin{bmatrix} \frac{1}{2}(1-j) \\ \frac{1}{\sqrt{2}}j \\ \frac{1}{2}(1-j) \\ -\frac{1}{\sqrt{2}}j \\ \frac{1}{2}(1-j) \\ \frac{1}{\sqrt{2}}j \\ \frac{1}{2}(1-j) \\ -\frac{1}{\sqrt{2}}j \\ \vdots \end{bmatrix};$$

when PMI=6, an eleventh equivalent channel in the second channel group and allocated to the user equipment is:

$$[T_0 \ldots T_{2M-1}]V\frac{1}{2}\begin{bmatrix} 1 \\ -\frac{1}{\sqrt{2}}(1+j) \\ j \\ \frac{1}{\sqrt{2}}(1-j) \end{bmatrix} = [T_0 \ldots T_{2M-1}]\frac{1}{\sqrt{2}}\begin{bmatrix} \frac{1}{2}(1+j) \\ -\frac{1}{\sqrt{2}}j \\ \frac{1}{2}(1+j) \\ -\frac{1}{\sqrt{2}}j \\ \frac{1}{2}(1+j) \\ -\frac{1}{\sqrt{2}}j \\ \frac{1}{2}(1+j) \\ -\frac{1}{\sqrt{2}}j \\ \vdots \end{bmatrix};$$

when PMI=7, a twelfth equivalent channel in the second channel group and allocated to the user equipment is:

$$[T_0 \ldots T_{2M-1}]V\frac{1}{2}\begin{bmatrix} 1 \\ \frac{1}{\sqrt{2}}(1-j) \\ -j \\ -\frac{1}{\sqrt{2}}(1+j) \end{bmatrix} = [T_0 \ldots T_{2M-1}]\frac{1}{\sqrt{2}}\begin{bmatrix} \frac{1}{2}(1-j) \\ -\frac{1}{\sqrt{2}}j \\ \frac{1}{2}(1-j) \\ \frac{1}{\sqrt{2}}j \\ \frac{1}{2}(1-j) \\ -\frac{1}{\sqrt{2}}j \\ \frac{1}{2}(1-j) \\ \frac{1}{\sqrt{2}}j \\ \vdots \end{bmatrix};$$

when PMI=12, a thirteenth equivalent channel in the second channel group and allocated to the user equipment is:

$$[T_0 \ldots T_{2M-1}]V\frac{1}{2}\begin{bmatrix} 1 \\ 1 \\ 1 \\ -1 \end{bmatrix} = [T_0 \ldots T_{2M-1}]\frac{1}{\sqrt{2}}\begin{bmatrix} 1 \\ 0 \\ 0 \\ j \\ 1 \\ 0 \\ 0 \\ j \\ \vdots \end{bmatrix};$$

when PMI=13, a fourteenth equivalent channel in the second channel group and allocated to the user equipment is:

$$[T_0 \ldots T_{2M-1}]V\frac{1}{2}\begin{bmatrix} 1 \\ 1 \\ -1 \\ 1 \end{bmatrix} = [T_0 \ldots T_{2M-1}]\frac{1}{\sqrt{2}}\begin{bmatrix} 0 \\ 1 \\ j \\ 0 \\ 0 \\ 1 \\ j \\ 0 \\ \vdots \end{bmatrix};$$

when PMI=14, a fifteenth equivalent channel in the second channel group and allocated to the user equipment is:

$$[T_0 \ldots T_{2M-1}]V\frac{1}{2}\begin{bmatrix} -1 \\ 1 \\ 1 \\ 1 \end{bmatrix} = [T_0 \ldots T_{2M-1}]\frac{1}{\sqrt{2}}\begin{bmatrix} 0 \\ 1 \\ -j \\ 0 \\ 0 \\ 1 \\ -j \\ 0 \\ \vdots \end{bmatrix};$$

and
when PMI=15, a sixteenth equivalent channel in the second channel group and allocated to the user equipment is:

$$[T_0 \ldots T_{2M-1}]V\frac{1}{2}\begin{bmatrix} 1 \\ -1 \\ -1 \\ -1 \end{bmatrix} = [T_0 \ldots T_{2M-1}]\frac{1}{\sqrt{2}}\begin{bmatrix} 0 \\ -1 \\ j \\ 0 \\ 0 \\ -1 \\ j \\ 0 \\ \vdots \end{bmatrix}.$$

8. The apparatus according to claim 7, wherein if there are eight ports for the UE, and if PMI=0, a seventeenth equivalent channel in the first channel group and allocated to the user equipment is:

$$[T_0 \ldots T_{2M-1}]V\frac{1}{\sqrt{8}}\begin{bmatrix}1\\1\\1\\1\\1\\1\\1\\1\end{bmatrix} = [T_0 \ldots T_{2M-1}]V\frac{1}{\sqrt{2}}\begin{bmatrix}1\\1\\0\\0\\1\\1\\0\\0\\\vdots\end{bmatrix},$$

wherein if PMI=7, an eighteenth equivalent channel in the first channel group and allocated to the user equipment is:

$$[T_0 \ldots T_{2M-1}]V\frac{1}{\sqrt{8}}\begin{bmatrix}1\\1\\1\\1\\j\\j\\j\\j\end{bmatrix} = [T_0 \ldots T_{2M-1}]V\frac{1}{\sqrt{2}}\begin{bmatrix}1\\1\\0\\0\\j\\j\\0\\0\\\vdots\end{bmatrix};$$

if PMI=8, a nineteenth equivalent channel in the first channel group and allocated to the user equipment is:

$$[T_0 \ldots T_{2M-1}]V\frac{1}{\sqrt{8}}\begin{bmatrix}1\\1\\1\\1\\-1\\-1\\-1\\-1\end{bmatrix} = [T_0 \ldots T_{2M-1}]V\frac{1}{\sqrt{2}}\begin{bmatrix}1\\1\\0\\0\\-1\\-1\\0\\0\\\vdots\end{bmatrix};$$

if PMI=16, a twentieth equivalent channel in the first channel group and allocated to the user equipment is:

$$[T_0 \ldots T_{2M-1}]V\frac{1}{\sqrt{8}}\begin{bmatrix}1\\1\\1\\1\\-j\\-j\\-j\\-j\end{bmatrix} = [T_0 \ldots T_{2M-1}]V\frac{1}{\sqrt{2}}\begin{bmatrix}1\\1\\0\\0\\-j\\-j\\0\\0\\\vdots\end{bmatrix};$$

if PMI=36, a twenty-first equivalent channel in the first channel group and allocated to the user equipment is:

$$[T_0 \ldots T_{2M-1}]V\frac{1}{\sqrt{8}}\begin{bmatrix}1\\-1\\1\\-1\\1\\-1\\1\\-1\end{bmatrix} = [T_0 \ldots T_{2M-1}]V\frac{1}{\sqrt{2}}\begin{bmatrix}1\\-1\\0\\0\\1\\-1\\0\\0\\\vdots\end{bmatrix};$$

if PMI=44, a twenty-second equivalent channel in the first channel group and allocated to the user equipment is:

$$[T_0 \ldots T_{2M-1}]V\frac{1}{\sqrt{8}}\begin{bmatrix}1\\-1\\1\\-1\\-1\\1\\-1\\1\end{bmatrix} = [T_0 \ldots T_{2M-1}]V\frac{1}{\sqrt{2}}\begin{bmatrix}1\\-1\\0\\0\\-1\\1\\0\\0\\\vdots\end{bmatrix};$$

if PMI=72, a twenty-third equivalent channel in the first channel group and allocated to the user equipment is:

$$[T_0 \ldots T_{2M-1}]V\frac{1}{\sqrt{8}}\begin{bmatrix}1\\-1\\1\\-1\\j\\-j\\j\\-j\end{bmatrix} = [T_0 \ldots T_{2M-1}]V\frac{1}{\sqrt{2}}\begin{bmatrix}1\\-1\\0\\0\\j\\-j\\0\\0\\\vdots\end{bmatrix};$$

if PMI=88, a twenty-fourth equivalent channel in the first channel group and allocated to the user equipment is:

$$[T_0 \ldots T_{2M-1}]V\frac{1}{\sqrt{8}}\begin{bmatrix}1\\-1\\1\\-1\\-j\\-j\\j\\j\end{bmatrix} = [T_0 \ldots T_{2M-1}]V\frac{1}{\sqrt{2}}\begin{bmatrix}1\\-1\\0\\0\\-j\\j\\0\\0\\\vdots\end{bmatrix};$$

if PMI=1, a twenty-fifth equivalent channel in the first channel group and allocated to the user equipment is:

$$[T_0 \ldots T_{2M-1}]V\frac{1}{\sqrt{8}}\begin{bmatrix}1\\j\\-1\\-j\\1\\j\\-1\\-j\end{bmatrix} = [T_0 \ldots T_{2M-1}]V\frac{1}{\sqrt{2}}\begin{bmatrix}0\\0\\j\\-1\\0\\0\\j\\-1\\\vdots\end{bmatrix};$$

if PMI=3, a twenty-sixth equivalent channel in the first channel group and allocated to the user equipment is:

$$[T_0 \ldots T_{2M-1}]V\frac{1}{\sqrt{8}}\begin{bmatrix}1\\j\\-1\\-j\\j\\-1\\-j\\1\end{bmatrix} = [T_0 \ldots T_{2M-1}]V\frac{1}{\sqrt{2}}\begin{bmatrix}0\\0\\j\\-1\\0\\0\\-1\\-j\\\vdots\end{bmatrix};$$

if PMI=6, a twenty-seventh equivalent channel in the first channel group and allocated to the user equipment is:

$$[T_0 \ldots T_{2M-1}]V\frac{1}{\sqrt{8}}\begin{bmatrix}1\\j\\-1\\-j\\-1\\-j\\1\\j\end{bmatrix} = [T_0 \ldots T_{2M-1}]V\frac{1}{\sqrt{2}}\begin{bmatrix}0\\0\\j\\-1\\0\\0\\-j\\1\\\vdots\end{bmatrix};$$

if PMI=12, a twenty-eighth equivalent channel in the first channel group and allocated to the user equipment is:

$$[T_0 \ldots T_{2M-1}]V\frac{1}{\sqrt{8}}\begin{bmatrix}1\\j\\-1\\-j\\j\\-1\\-j\\1\end{bmatrix} = [T_0 \ldots T_{2M-1}]V\frac{1}{\sqrt{2}}\begin{bmatrix}0\\0\\j\\-1\\0\\0\\1\\j\\\vdots\end{bmatrix};$$

if PMI=17, a twenty-ninth equivalent channel in the first channel group and allocated to the user equipment is:

$$[T_0 \ldots T_{2M-1}]V\frac{1}{\sqrt{8}}\begin{bmatrix}1\\-j\\-1\\j\\1\\-j\\-1\\j\end{bmatrix} = [T_0 \ldots T_{2M-1}]V\frac{1}{\sqrt{2}}\begin{bmatrix}0\\0\\j\\1\\0\\0\\1\\j\\\vdots\end{bmatrix};$$

if PMI=20, a thirtieth equivalent channel in the first channel group and allocated to the user equipment is:

$$[T_0 \ldots T_{2M-1}]V\frac{1}{\sqrt{8}}\begin{bmatrix}1\\-j\\-1\\j\\j\\1\\-j\\-1\end{bmatrix} = [T_0 \ldots T_{2M-1}]V\frac{1}{\sqrt{2}}\begin{bmatrix}0\\0\\j\\1\\0\\0\\-1\\j\\\vdots\end{bmatrix};$$

if PMI=32, a thirty-first equivalent channel in the first channel group and allocated to the user equipment is:

$$[T_0 \ldots T_{2M-1}]V\frac{1}{\sqrt{8}}\begin{bmatrix}1\\-j\\-1\\j\\-1\\j\\1\\-j\end{bmatrix} = [T_0 \ldots T_{2M-1}]V\frac{1}{\sqrt{2}}\begin{bmatrix}0\\0\\j\\1\\0\\0\\-j\\-1\\\vdots\end{bmatrix};$$

and if PMI=40, a thirty-second equivalent channel in the first channel group and allocated to the user equipment is:

$$[T_0 \ldots T_{2M-1}]V\frac{1}{\sqrt{8}}\begin{bmatrix}1\\-j\\-1\\j\\-j\\-1\\j\\1\end{bmatrix} = [T_0 \ldots T_{2M-1}]V\frac{1}{\sqrt{2}}\begin{bmatrix}0\\0\\j\\1\\0\\0\\1\\-j\\\vdots\end{bmatrix}.$$

9. A base station, wherein the base station is a base station in a joint scheduling base station group and includes a communications interface, a memory, a processor, and a remote radio, wherein the communications interface is configured to receive a precoding matrix indication (PMI) value and reference signal received power (RSRP) that are sent by user equipment (UE);

the remote radio is configured to determine, based on the RSRP, a network area to which the UE belongs; and the processor is configured to: if the UE is served by the base station in the joint scheduling base station group, allocate an equivalent channel that corresponds to the base station and that is in a first equivalent channel group to the UE based on the PMI value; and if the UE belongs to an overlapped area of the base station and another base station that are in the joint scheduling base station group, allocate an equivalent channel that corresponds to the base station and the another base station and that is in a second equivalent channel group to the UE based on the PMI value, stop, by the base station, transmitting data on the equivalent channel that corresponds to the first base station and that is in the first equivalent channel group, and jointly stop, by the base station and the another base station, sending data on another equivalent channel corresponding to the another base station, wherein the first equivalent channel group and the second equivalent channel group have different radio frequency channels.

* * * * *

UNITED STATES PATENT AND TRADEMARK OFFICE
CERTIFICATE OF CORRECTION

PATENT NO. : 10,812,232 B2  
APPLICATION NO. : 16/728429  
DATED : October 20, 2020  
INVENTOR(S) : Libiao Wang, Fan Jin and Wei Chen Page 1 of 6

It is certified that error appears in the above-identified patent and that said Letters Patent is hereby corrected as shown below:

In Claim 3, Column 29, Lines 41-60, delete "
$$[T_0 \ldots T_{2M-1}]V\frac{1}{2}\begin{bmatrix} 1 \\ \frac{1}{\sqrt{2}}(1+j) \\ j \\ -\frac{1}{\sqrt{2}}(1-j) \end{bmatrix} = [T_0 \ldots T_{2M-1}]V\frac{1}{\sqrt{2}}\begin{bmatrix} \frac{1}{2}(1+j) \\ \frac{1}{\sqrt{2}}j \\ \frac{1}{2}(1+j) \\ \frac{1}{\sqrt{2}}j \\ \frac{1}{2}(1+j) \\ \frac{1}{\sqrt{2}}j \\ \frac{1}{2}(1+j) \\ \frac{1}{\sqrt{2}}j \\ \vdots \end{bmatrix}$$
" and Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office* insert --
$$[T_0 \cdots T_{2M-1}]V\frac{1}{2}\begin{bmatrix}1\\ \frac{1}{\sqrt{2}}(1+j)\\ j\\ -\frac{1}{\sqrt{2}}(1-j)\end{bmatrix} = [T_0 \cdots T_{2M-1}]\frac{1}{\sqrt{2}}\begin{bmatrix}\frac{1}{2}(1+j)\\ \frac{1}{\sqrt{2}}j\\ \frac{1}{2}(1+j)\\ \frac{1}{\sqrt{2}}j\\ \frac{1}{2}(1+j)\\ \frac{1}{\sqrt{2}}j\\ \frac{1}{2}(1+j)\\ \frac{1}{\sqrt{2}}j\\ \vdots\end{bmatrix}$$
--.

In Claim 3, Column 30, Lines 1-19, delete "
$$[T_0 \cdots T_{2M-1}]V\frac{1}{2}\begin{bmatrix}1\\ -\frac{1}{\sqrt{2}}(1-j)\\ -j\\ \frac{1}{\sqrt{2}}(1+j)\end{bmatrix} = [T_0 \cdots T_{2M-1}]V\frac{1}{\sqrt{2}}\begin{bmatrix}\frac{1}{2}(1-j)\\ \frac{1}{\sqrt{2}}j\\ \frac{1}{2}(1-j)\\ -\frac{1}{\sqrt{2}}j\\ \frac{1}{2}(1-j)\\ \frac{1}{\sqrt{2}}j\\ \frac{1}{2}(1-j)\\ -\frac{1}{\sqrt{2}}j\\ \vdots\end{bmatrix}$$
" and insert --
$$[T_0 \cdots T_{2M-1}]V\frac{1}{2}\begin{bmatrix}1\\ -\frac{1}{\sqrt{2}}(1-j)\\ -j\\ \frac{1}{\sqrt{2}}(1+j)\end{bmatrix} = [T_0 \cdots T_{2M-1}]\frac{1}{\sqrt{2}}\begin{bmatrix}\frac{1}{2}(1-j)\\ \frac{1}{\sqrt{2}}j\\ \frac{1}{2}(1-j)\\ -\frac{1}{\sqrt{2}}j\\ \frac{1}{2}(1-j)\\ \frac{1}{\sqrt{2}}j\\ \frac{1}{2}(1-j)\\ \frac{1}{\sqrt{2}}j\\ \vdots\end{bmatrix}$$
--.

CERTIFICATE OF CORRECTION (continued)
U.S. Pat. No. 10,812,232 B2

In Claim 3, Column 30, Lines 25-40, delete "$[T_0 \ \cdots \ T_{2M-1}]V\frac{1}{2}\begin{bmatrix} 1 \\ -\frac{1}{\sqrt{2}}(1+j) \\ j \\ \frac{1}{\sqrt{2}}(1-j) \end{bmatrix} = [T_0 \ \cdots \ T_{2M-1}]V\frac{1}{\sqrt{2}}\begin{bmatrix} \frac{1}{2}(1+j) \\ -\frac{1}{\sqrt{2}}j \\ \frac{1}{2}(1+j) \\ -\frac{1}{\sqrt{2}}j \\ \frac{1}{2}(1+j) \\ -\frac{1}{\sqrt{2}}j \\ \frac{1}{2}(1+j) \\ -\frac{1}{\sqrt{2}}j \\ \vdots \end{bmatrix}$" and insert --$[T_0 \ \cdots \ T_{2M-1}]V\frac{1}{2}\begin{bmatrix} 1 \\ -\frac{1}{\sqrt{2}}(1+j) \\ j \\ \frac{1}{\sqrt{2}}(1-j) \end{bmatrix} = [T_0 \ \cdots \ T_{2M-1}]\frac{1}{\sqrt{2}}\begin{bmatrix} \frac{1}{2}(1+j) \\ -\frac{1}{\sqrt{2}}j \\ \frac{1}{2}(1+j) \\ -\frac{1}{\sqrt{2}}j \\ \frac{1}{2}(1+j) \\ -\frac{1}{\sqrt{2}}j \\ \vdots \end{bmatrix}$;--.

In Claim 3, Column 30, Lines 46-64, delete "$[T_0 \ \cdots \ T_{2M-1}]V\frac{1}{2}\begin{bmatrix} 1 \\ \frac{1}{\sqrt{2}}(1-j) \\ -j \\ -\frac{1}{\sqrt{2}}(1+j) \end{bmatrix} = [T_0 \ \cdots \ T_{2M-1}]V\frac{1}{\sqrt{2}}\begin{bmatrix} \frac{1}{2}(1-j) \\ -\frac{1}{\sqrt{2}}j \\ \frac{1}{2}(1-j) \\ \frac{1}{\sqrt{2}}j \\ \frac{1}{2}(1-j) \\ -\frac{1}{\sqrt{2}}j \\ \frac{1}{2}(1-j) \\ \frac{1}{\sqrt{2}}j \\ \vdots \end{bmatrix}$" and

CERTIFICATE OF CORRECTION (continued)
U.S. Pat. No. 10,812,232 B2 insert --
$$[T_0 \cdots T_{2M-1}]V\frac{1}{2}\begin{bmatrix} 1 \\ \frac{1}{\sqrt{2}}(1-j) \\ -j \\ -\frac{1}{\sqrt{2}}(1+j) \end{bmatrix} = [T_0 \cdots T_{2M-1}]\frac{1}{\sqrt{2}}\begin{bmatrix} \frac{1}{2}(1-j) \\ -\frac{1}{\sqrt{2}}j \\ \frac{1}{2}(1-j) \\ \frac{1}{\sqrt{2}}j \\ \frac{1}{2}(1-j) \\ -\frac{1}{\sqrt{2}}j \\ \frac{1}{2}(1-j) \\ \frac{1}{\sqrt{2}}j \\ \vdots \end{bmatrix}; --.$$

In Claim 4, Column 32, Lines 1-14, delete "
$$[T_0 \cdots T_{2M-1}]V\frac{1}{\sqrt{8}}\begin{bmatrix} 1 \\ 1 \\ 1 \\ 1 \\ 1 \\ 1 \\ 1 \\ 1 \end{bmatrix} = [T_0 \cdots T_{2M-1}]\frac{1}{\sqrt{2}}\begin{bmatrix} 1 \\ 1 \\ 0 \\ 0 \\ 1 \\ 1 \\ 0 \\ 0 \\ \vdots \end{bmatrix},$$
" and insert $$[T_0 \cdots T_{2M-1}]V\frac{1}{\sqrt{8}}\begin{bmatrix} 1 \\ 1 \\ 1 \\ 1 \\ 1 \\ 1 \\ 1 \\ 1 \end{bmatrix} = [T_0 \cdots T_{2M-1}]V\frac{1}{\sqrt{2}}\begin{bmatrix} 1 \\ 1 \\ 0 \\ 0 \\ 1 \\ 1 \\ 0 \\ 0 \\ \vdots \end{bmatrix},$$
--.

In Claim 4, Column 32, Lines 20-30, delete "
$$[T_0 \cdots T_{2M-1}]V\frac{1}{\sqrt{8}}\begin{bmatrix} 1 \\ 1 \\ 1 \\ 1 \\ j \\ j \\ j \\ j \end{bmatrix} = [T_0 \cdots T_{2M-1}]\frac{1}{\sqrt{2}}\begin{bmatrix} 1 \\ 1 \\ 0 \\ 0 \\ j \\ j \\ 0 \\ 0 \\ \vdots \end{bmatrix};$$
" and insert

CERTIFICATE OF CORRECTION (continued)
U.S. Pat. No. 10,812,232 B2

In Claim 4, Column 32, Lines 37-58, delete "
$$[T_0 \cdots T_{2M-1}]V\frac{1}{\sqrt{8}}\begin{bmatrix}1\\1\\1\\1\\1\\-1\\-1\\-1\\-1\end{bmatrix} = [T_0 \cdots T_{2M-1}]V\frac{1}{\sqrt{2}}\begin{bmatrix}1\\1\\0\\0\\-1\\-1\\0\\0\\\vdots\end{bmatrix}$$
" and insert
$$[T_0 \cdots T_{2M-1}]V\frac{1}{\sqrt{8}}\begin{bmatrix}1\\1\\1\\1\\1\\-1\\-1\\-1\\-1\end{bmatrix} = [T_0 \cdots T_{2M-1}]\frac{1}{\sqrt{2}}\begin{bmatrix}1\\1\\0\\0\\-1\\-1\\0\\0\\\vdots\end{bmatrix}$$
--.

In Claim 6, Column 36, Lines 31-44, delete "
$$[T_0 \cdots T_{2M-1}]V\frac{1}{2}\begin{bmatrix}1\\1\\1\\1\end{bmatrix} = [T_0 \cdots T_{2M-1}]V\frac{1}{\sqrt{2}}\begin{bmatrix}1\\1\\0\\0\\1\\1\\0\\0\\\vdots\end{bmatrix}$$
" and insert
$$[T_0 \cdots T_{2M-1}]V\frac{1}{2}\begin{bmatrix}1\\1\\1\\1\end{bmatrix} = [T_0 \cdots T_{2M-1}]\frac{1}{\sqrt{2}}\begin{bmatrix}1\\1\\0\\0\\1\\1\\0\\0\\\vdots\end{bmatrix}$$
--.

CERTIFICATE OF CORRECTION (continued)
U.S. Pat. No. 10,812,232 B2

In Claim 6, Column 36, Lines 52-64, delete "$[T_0 \ \cdots \ T_{2M-1}]V\frac{1}{2}\begin{bmatrix}1\\-1\\1\\-1\end{bmatrix} = [T_0 \ \cdots \ T_{2M-1}]V\frac{1}{\sqrt{2}}\begin{bmatrix}1\\-1\\0\\0\\1\\-1\\0\\0\\\vdots\end{bmatrix};$" and insert -- $[T_0 \ \cdots \ T_{2M-1}]V\frac{1}{2}\begin{bmatrix}1\\-1\\1\\-1\end{bmatrix} = [T_0 \ \cdots \ T_{2M-1}]\frac{1}{\sqrt{2}}\begin{bmatrix}1\\-1\\0\\0\\1\\-1\\0\\0\\\vdots\end{bmatrix}$ --.